(12) United States Patent
Moriyama

(10) Patent No.: US 6,513,049 B1
(45) Date of Patent: Jan. 28, 2003

(54) DATA PROCESSING METHOD, RECORDING MEDIUM, AND DATA PROCESSING APPARATUS

(75) Inventor: Koichi Moriyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/259,311

(22) Filed: Mar. 1, 1999

(30) Foreign Application Priority Data

Mar. 4, 1998 (JP) .......................................... 10-052493

(51) Int. Cl.⁷ .............................................. G06F 17/00
(52) U.S. Cl. ...................... 707/201; 709/313; 709/315; 709/319; 709/322; 707/103.7
(58) Field of Search .............. 707/1–206; 709/310–332, 709/100–108

(56) References Cited

U.S. PATENT DOCUMENTS 5,377,350 A * 12/1994 Skinner ....................... 709/316
5,884,316 A *  3/1999 Bernstein et al. ........... 709/315
6,125,366 A *  9/2000 Bernstein et al. ............. 707/10

OTHER PUBLICATIONS

Bosc et al., "Fuzzy service selection in a distributed object-oriented environment", Fuzzy Systems, IEEE Transactions on, vol. 9, Issue 5, Oct. 2001, pp. 682–698.*

Chun et al., "A Corba–based telemedicine system for medical image analysis and modeling", Computer–based Medical Systems, 2001, Proceedings, 14th IEEE Symposium on, pp. 53–58.*

Wall et al., "Mobile RMI: supporting remote access to Java server objects on mobile hosts", Distributed Objected and Applications, 2001, Proceedings, 3rd International Symposium on, 2001, pp. 41–51.*

* cited by examiner

Primary Examiner—David Jung
(74) Attorney, Agent, or Firm—Jay H. Maioli

(57) ABSTRACT

Message passing is suitably performed even if there are a plurality of server objects, and even if a processing request is received and a processing result is returned by a different server object. When sending a message from a client object to a server object, a data area for storing a result of processing executed by the server object is reserved. In executing the processing by the server object, an authorization to return the processing result of the server object to the client object is delegated between the server objects. Then, the result of the processing executed by the object which was most recently delegated to possess the above authorization is stored in the data area. The client object then reads the data stored in the data area so as to receive the processing result by the server object.

8 Claims, 9 Drawing Sheets

DATA PROCESSING METHOD, RECORDING MEDIUM, AND DATA PROCESSING APPARATUS

BACKGROUND OF THE INVENTION

1. Field of the Invention

The present invention relates to a data processing method employed when messages are exchanged between a client object and a plurality of server objects. The invention also relates to a recording medium on which an operating system implementing the above data processing method is recorded, and to a data processing apparatus provided with the above recording medium.

2. Description of the Related Art

Hitherto, software, such as application programs, is usually described by using a function call. The basic operation of the function call is shown in FIG. 1. In FIG. 1, the function calling side is shown as a client, while the function-call receiving side is shown as a server.

In the function call, the client calls the function of the server, as indicated by the arrow A1 in FIG. 1, thereby causing the server to execute the function, as indicated by the solid line A2 in FIG. 1. During this function calling, the client is in the waiting state, as represented by the single-dot-chain line A3 in FIG. 1. Upon completing the processing executed by the server, the server returns the value to the client, as indicated by the arrow A4 in FIG. 1, thereby causing the client to restart processing, as indicated by the solid line A5 in FIG. 1.

Along with recent advances in software programming techniques, the development of software based on the object-oriented technique is progressing. When the object-oriented technique is applied to software, the functions of the software, such as application programs, can be formed into modules by forming objects. By exchanging the required information with each other such as messages, the objects fulfill their functions as modules. Such message exchanges are referred to as "message passing".

As a method for implementing message passing, various techniques have been proposed and have been put into practical use. One of the techniques is "future"-based message passing. The basic operation of future-based message passing is shown in FIG. 2.

In future-based message passing, a message is sent from a client object to a server object, as represented by the arrow B1 in FIG. 2, to request the server object to perform predetermined processing. At this time, a data area for storing the result of the processing executed by the server object is reserved. The data area is an area for storing the result to be received by the client object, and is referred to as a "future".

The server object executes processing, as indicated by the solid line B2 in FIG. 2, in accordance with the request of the message sent from the client object. When the processing is completed, the server object stores the processing result in the future, as represented by the arrow B3 in FIG. 2.

Meanwhile, the client object continues processing, as indicated by the solid line B4 in FIG. 2, after sending the above message to the server object. Thereafter, when the client object requires the result of the processing performed by the server object, it reads the data stored in the future, as represented by the arrow B5 in FIG. 2.

At this time, if the result of the processing executed by the server object has not yet been stored in the future, the client object is in the waiting state, as represented by the single-dot-chain line B6 in FIG. 2. When the processing result sent from the server object is stored in the future, it is delivered to the client object from the future, as represented by the arrow B7 in FIG. 2.

That is, if the result of the processing executed by the server object is stored in the future, the client object immediately receives the processing result. If, however, the result of the processing performed by the server object has not yet been stored in the future, the client object remains in the waiting state until the result is stored in the future.

In the development of object-oriented software, the functions of the software, such as application programs, are formed into modules by forming objects, as noted above. In this case, software, such as an application program, may be implemented by a single object. Alternatively, each function of the application program may be further formed into a module, so that the application program can be implemented by a plurality of objects.

In performing the above-described message passing, if the server object is implemented by a single object, it executes the processing requested by the client object by using the single object in response to the message sent from the client object, and then delivers the processing result to the client object. This type of message passing can be handled in a manner similar to the concept of the function calling illustrated in FIG. 1, based on the fact that the processing request is received and the processing result is returned by the same object. Even if there are a plurality of server objects, the above message passing can be handled in a manner similar to the concept of the function calling if a server object that receives the processing request is the same as a server object that returns the processing result.

However, if there are a plurality of server objects, and a server object that receives the processing request is different from a server object that returns the processing result, the aforementioned message passing cannot be handled in a manner similar to that of the function calling. Accordingly, it becomes necessary, for example, that the client object takes into account that the processing request is received and the processing result is returned by different server objects. However, such a requirement for the client server becomes a heavy burden on programming.

SUMMARY OF THE INVENTION

Accordingly, in view of the above background of the conventional art, it is an object of the present invention to provide a data processing method in which even if there are a plurality of server objects, and even if a server, object that receives a processing request is different a server object that returns a processing result, message passing can be performed between the client object and the server object while eliminating the need for the client object to take into account that the processing request is received and the processing result is returned by the different server objects.

It is another object of the present invention to provide a recording medium on which an operating system implementing the above-described data processing method is recorded, and to provide a data processing apparatus provided with such a recording medium.

In order to achieve the above objects, according to one aspect of the present invention, there is provided a data processing method in which a message is sent from a client object to a server object having two or more objects, and the server object excutes processing in response to a request by the message and returns a result of the processing to the client object. In the aforementioned data processing method, upon sending the message from the client object to the server object, a data area for storing the result of the processing executed by the server object is reserved. When the processing is executed by the server object in response to the request by the message, an authorization to return the result of the processing executed by the server object to the client object is delegated between the objects of the server object. The result of the processing executed by the object which was most recently delegated to possess the authorization is stored in the data area. The result of the processing executed by the server object is received by the client object by reading the data stored in the data area.

With this arrangement, an authorization to return to the client object the result of the processing executed by the server object is delegated between the objects of the server object, and the processing result of the object which was most recently delegated to possess the authorization is stored in the data area. Thus, even if a processing request is received and a processing result is returned by different objects, the result of the processing executed by the server object can be correctly delivered to the client object via the above-described data area.

According to another aspect of the present invention, there is provided a recording medium on which an operating system is recorded. The operating system has message-sending means for sending a message from a client object to a server object, and authorization-delegating means for delegating an authorization between objects, both means being used as application program interfaces for describing objects. The above-described operating system sends a message from the client object to the server object upon being requested to execute the message-sending means, and also reserves a data area for storing a result of processing executed by the server object. The operating system delegates an authorization to return the result of the processing executed by the server object to the client object from one object of the server object to another object of the server object upon being requested to execute the authorization-delegating means. The operating system stores the result of the processing executed by an object which was most recently delegated to possess the authorization by the authorization-delegating method, upon completing the processing by the server object in response to the message sent to the server object by the message-sending means.

With the above arrangement, upon completing the processing by the server object in response to the message sent to the server object by the message-sending means, the operating system recorded on the recording medium stores in the data area the result of the processing executed by the object which was most recently delegated to possess the above authorization by the authorization-delegating means. Simultaneously, the client object is able to receive the processing result of the server object by reading the data stored in the data area, regardless of whether an authorization is delegated within the server object. Hence, by using the aforementioned operating system, it is possible to correctly deliver the processing result of the server object to the client object via the data area even if a processing request is received and a processing result is returned by different objects of the server object.

According to a further aspect of the present invention, there is provided a data processing apparatus comprising a recording medium on which an operating system is recorded. The operating system has message-sending means for sending a message from a client object to a server object, and authorization-delegating means for delegating an authorization between objects, both means being used as application program interfaces for describing objects. The operating system sends a message from the client object to the server object upon being requested to execute the message-sending means, and also reserves a data area for storing a result of processing executed by the server object. The operating system delegates an authorization to return the result of the processing executed upon the server object to the client object from one object of the server object to another object of the server object by being requested to execute the authorization-delegating means. The operating system stores the result of the processing executed by an object which was most recently delegated to possess the authorization by the authorization-delegating means, upon completing the processing by the server object in response to the message sent to the server object by the message-sending means.

With this arrangement, upon completing the processing by the server object in response to the message sent to the server object by the above-described message-sending means, the operating system recorded on the recording medium provided for the aforementioned data processing apparatus stores in the data area the result of the processing executed by the object which was most recently delegated to possess the above authorization by the authorization-delegating means. Simultaneously, the client object is able to receive the processing result of the server object by reading the data stored in the data area, regardless of whether an authorization is delegated within the server object. Hence, by using the aforementioned operating system, it is possible to correctly deliver the processing result of the server object to the client object via the data area even if a processing request is received and a processing result is returned by different objects of the server object.

In this specification, software for managing the execution of application programs is referred to as "an operating system" in a broad sense. That is, the operating system described in this specification includes not only basic software for managing hardware, but also, software operating on basic software for managing hardware and managing the execution of application programs, which is referred to as, "middleware". Further, the operating system described in this specification includes software implementing a virtual computer system, in which a plurality of program execution environments are implemented by a single computer, and it appears to the user that a plurality of computers are operating.

DESCRIPTION OF THE PREFERRED EMBODIMENT

An embodiment of the present invention is described below in detail with reference to the drawings.

1. Hardware Environment

An example of a data processing apparatus incorporating the present invention is first described with reference to FIG. 3. As an embodiment of the present invention, a television set loaded with a data processing function incorporating the present invention is described. However, the present invention is applicable to other types of data processing apparatuses. That is, the present invention is widely used in data processing apparatuses on which an operating system runs, for example, audio-visual machines (what is called, "AV machines") other than the television such as office machines, and ordinary computers.

Figure 1:
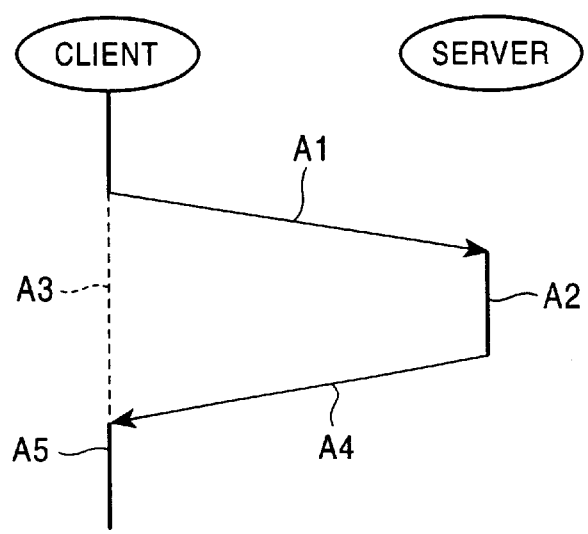
FIG. 1 illustrates the basic operation of function calling.
Figure 2:
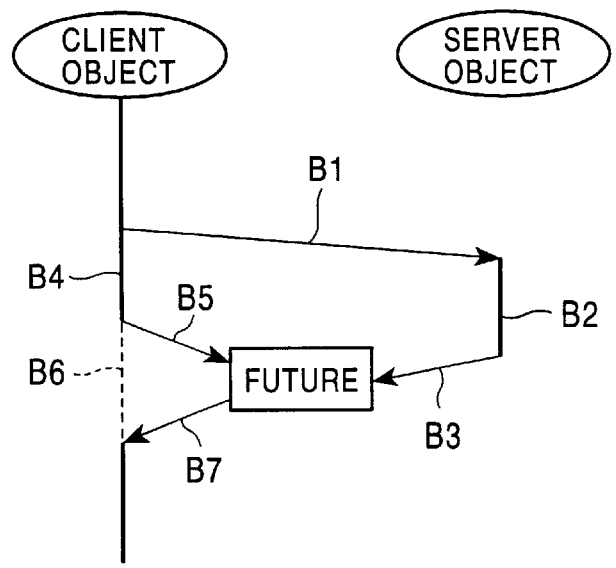
FIG. 2 illustrates the basic operation of message passing performed by using a future.
Figure 3:
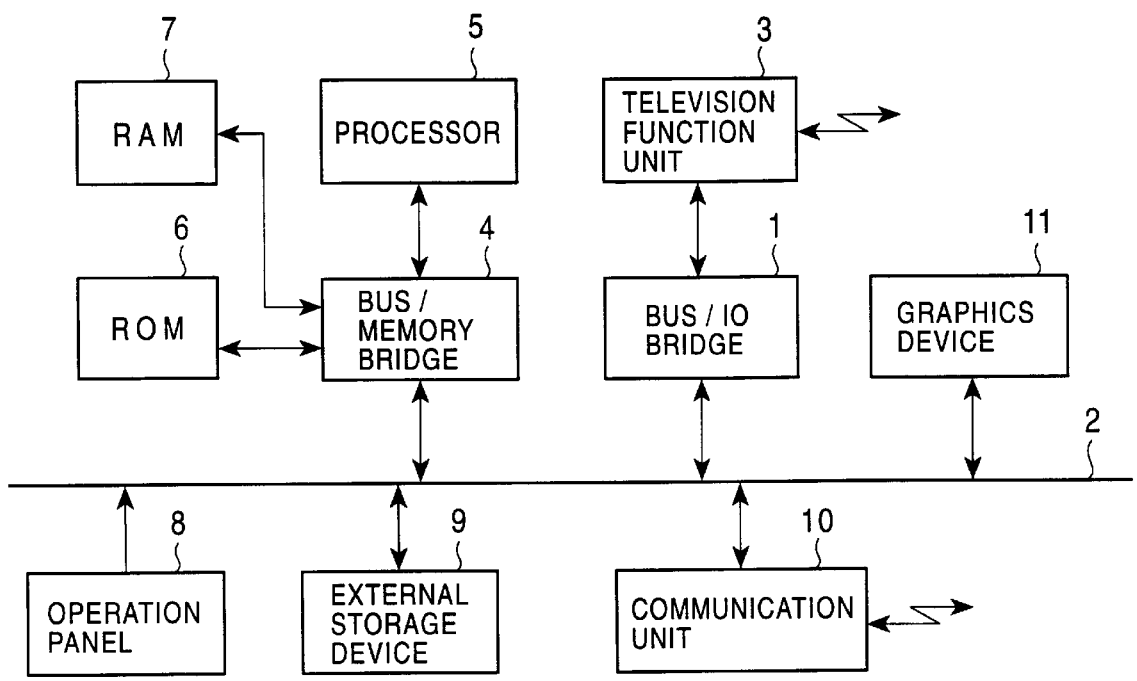
FIG. 3 illustrates the schematic configuration of an example of a television set incorporating the present invention.

The television set shown in FIG. 3, which serves as the data processing apparatus incorporating the present invention, receives a signal from a broadcast station via an antenna or a cable (neither of them is shown), and based on the signal, displays an image on an image display unit, such as a cathode ray tube or a liquid crystal panel, and also outputs sound from a speaker.

The television set is not only provided with an ordinary television function, but is also able to receive programs and data from an external source. The television set is formed of, as illustrated in FIG. 3, a television function unit 3 connected to a bus 2 via a bus/input output (IO) bridge 1, a processor 5 connected to the bus 2 via a bus/memory bridge 4, a read only memory (ROM) 6 and a random access memory (RAM) 7 connected to the processor 5 via the bus/memory bridge 4, and an operation panel 8, an external storage device 9, a communication unit 10, and a graphics device 11, all of which are connected to the bus 2.

The television function unit 3 serves the function of reproducing images and sounds based on a signal received by the antenna or the cable (neither of them is shown). The television function unit 3 is connected to the bus 2 via the bus/IO bridge 1 so that it can transmit or receive signals to or from the other elements.

The processor 5, which serves as a computation unit for controlling the individual elements of the television set, is connected to the bus 2 via the bus/memory bridge 4. The ROM 6 and the RAM 7 are connected to the processor 5 via the bus/memory bridge 4.

The ROM 6 stores an operating system and application programs used for the control performed by the processor 5. The operating system stored in the ROM 6 is an object-oriented operating system implementing object orientation.

The RAM 7 is used as a work area for the processor 5. More specifically, the processor 5 runs the operating system and the application programs stored in the ROM 6 by using the RAM 7 as a work area, thereby controlling the individual elements of the television set.

The operation panel 8 is an input unit for receiving the operation which is input by the user, and a signal indicating an instruction for, for example, the switching of the channel or the volume control of the television set, is input from this operation panel 8. More specifically, the operation panel 8 is formed of an input unit provided with a plurality of buttons for inputting various signals and a pointing device, for example, a mouse. The signal input through the operation panel 8 is input into the processor 5 via the bus 2 and the bus/memory bridge 4. The processor 5 then executes predetermined computational processing based on the signal input through the operation panel 8, thereby controlling the individual elements.

The external storage device 9, which is formed of, for example, a hard disk drive unit, is used for recording data, such as images and sounds, control data required for controlling the television set, application programs externally downloaded via the communication unit 10, etc.

The communication unit 10, which is an input/output unit for performing data communications with an external source, is formed of a modem, a terminal adapter, etc.

The graphics device 11 processes data recorded on the external storage device 9 and data received from an external source via the communication unit 10, and displays the corresponding images.

The television set not only includes an ordinary television function provided by the television function unit 3, but also receives data from an external source via the communication unit 10. More specifically, the television set is able to receive, for example, a new software module from an external network via the communication unit 10, thereby upgrading the version of the operating system and the application programs.

In this television set, the processor 5 runs the operating system stored in the ROM 6, and also executes the application programs for the operating system stored in the ROM 6 and in the external storage device 9, thereby controlling the individual elements of the television set. That is, the television set is provided with the ROM 6, which serves as a computer-readable recording medium on which the operating system is recorded.

The operating system may be stored in the RAM 7 or the external storage device 9, particularly when it is desired that the operating system be overwritten.

2. Software Environment

The software environment of the above-described television set is now described.

2-1 Schematic Configuration of Operating System

The operating system used in the aforementioned television set is an object-oriented operating system. In other words, software, such as an application program, running on the operating system is formed into modules such as objects, and object interaction is conducted by message passing.

Figure 4:
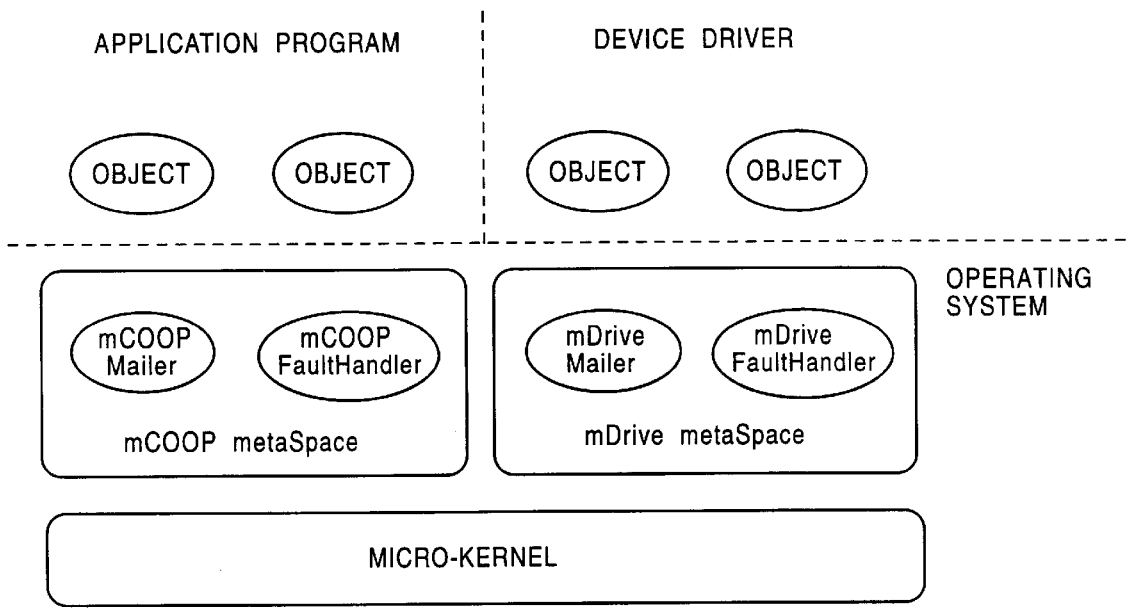
FIG. 4 illustrates the operating system installed in the television set shown in FIG. 3.

This operating system has a micro-kernel, as shown in FIG. 4, that provides the basic function as the operating system, thereby making it possible to simultaneously provide a plurality of program execution environments on the micro-kernel. In the following description, the program execution environment provided by the operating system is referred to as a "metaSpace".

More specifically, the operating system provides, as a metaSpace, an mCOOP metaSpace constructed by a plurality of objects, and an mDrive metaSpace constructed by a plurality of objects. An application program interface (hereinafter referred to as an "API") used for describing objects of an application program is assigned to each metaSpace. In the following description, an object used in a metaSpace is referred to as a "metaObject".

The mCOOP metaSpace is a metaSpace primarily for operating an object-oriented application program (for example, an application program for implementing a graphical user interface for controlling the operation panel 8). The "m" in mCOOP metaSpace represents a metaSpace, and "COOP" stands for Concurrent Object Oriented Programming.

The mDrive metaSpace is a metaSpace for operating a device driver (for example, a device driver for controlling the graphics device 11 or a device driver for controlling the communication unit 10 to transmit and receive data via a network) primarily for controlling hardware. The "m" in mDrive metaSpace designates a metaSpace, and "Drive" represents a metaSpace for operating the device driver (Device Driver).

That is, in this operating system, the mCOOP metaSpace and the mDrive metaSpace are operated on the micro-kernel. An application program formed into modules as objects is operated in the mCOOP metaSpace, while a device driver formed into modules as objects is operated in the mDrive metaSpace.

This operating system is able to provide not only mCOOP metaSpace and mDrive metaSpace, as the metaSpace operating on the micro-kernel, but also a metaSpace for operating, for example, a procedure-oriented application program (for example, an application program for causing the television function unit 3 to display moving pictures).

The metaobject forming mCOOP metaSpace includes, for example, an object "mCOOPMailer" and an object "mCOOPFaultHandler". The object "mCOOPMailer" is a metaobject used for performing message passing between application programs running in the mCOOP metaSpace. The object "mCOOPFaultHandler" is a metaObject for executing exception handling. In practice, the mCOOP metaSpace is formed, not only of the above-described metaobjects, but also of other metaobjects.

The metaobject forming mDrive metaSpace includes, for example, an object "mDriveMailer" and an object "mDrive-FautlHandler". The object "mDriveMailer" is a metaObject used for performing message passing between device drivers running in the mDrive metaSpace. The object "mDrive-FaultHandler" is a metaobject for executing exception handling. In practice, the mDrive metaSpace, as well as the mCOOP metaSpace, is formed not only of the above-described metaObjects, but also of other metaobjects.

This operating system provides the function of future-based message passing, which is discussed in detail below. In the following description, in the future-based message passing, the object that sends a message to another object to request it to execute processing is referred to as a "client object". Conversely, the object that receives the message from the client object and executes processing based on the message is referred to as a "server object".

2-2 mCOOP metaSpace API

In order to perform future-based message passing in the mCOOP metaSpace, the aforementioned operating system provides the following methods as the APIs used for describing the objects operating in the mCOOP metaSpace. In this specification, the API is indicated according to the description method of the Object Management Group Interface Definition Language (OMG IDL).

sError SendWithRBox(in OID destObjID, in Selector meth, in any msg, in size_t sizeOfMsg, out RID rBoxID)

sError Receive(in RID rBoxID, in any msg, in size_t sizeOfMsg)

sError Reply(in any resultMsg, in size_t sizeOfResultMsg)

sError Delegate (in OID destObjID, in Selector meth, in any msg, in size_t sizeOfMsg)

The above methods are discussed below in detail.

2-2-1 SendWithRBox( )

sError SendWithRBox(in OID destObjID, in Selector meth, in any msg, in size_t sizeOfMsg, out RID rBoxID)

The method "mSendWithRBox" is a message-sending method for sending a message from a client object to a server object. That is, the method "SendWithRBox" is employed when it becomes necessary for the client object to obtain the result of the processing executed by the server object after it has sent a message to the server object.

The argument "destObjID" is an argument of the "OID" type, which is a data type for specifying the object. The value specifying the server object is set in the argument "destObjID".

The argument "meth" is an argument of the "Selector" type, which is a data type for designating the method. The value designating the method of the server object for describing the processing to be requested is set in the argument "meth".

The argument "msg" is an argument of the "any" type, which is an arbitrary data type. The pointer to the area for storing the message to be delivered to the server obj is set in the argument "msg".

The argument "sizeOfMsg" is an argument of the type, which is a data type for specifying the size of the data. The value indicating the size of the message to be delivered to the server object is set in the argument "sizeOfMsg".

When the method "SendWithRBox" is issued, the data area "RBox" for storing the result of the processing executed by the server object is reserved by the object "mCOOPMailer", which will be discussed later. The data area "RBox" is an area in which the result to be received by the client object is stored, and is referred to as a "future".

After sending the message to the server object, the method "SendWithRBox" obtains the identifier "rBoxID" of the "RID" type, which is a data type for specifying the data area "RBox". The identifier "RBoxID" is an identifier for designating the data area "RBox" reserved by the object "mCOOPMailer" when the method "SendWithRBox" has been issued.

The method "SendWithRBox" acquires the value of the "sError" type as the return value, which is a data type representing the error code. That is, if the processing of the "SendWithRBox" is not correctly completed in issuing this method, the error code indicating the error reason is returned as the return value. If the processing is correctly completed, the value indicating that the processing has been correctly completed is returned as the return value.

2-2-2 Receive( )

sError Receive(in RID rBoxID, in any msg, in size_t sizeOfMsg)

The method "Receive" is a data reading method for reading data stored in the data area "RBox". That is, the method "Receive" is used when the client object receives the result of the processing executed by the server object after it has issued the method "SendWithRBox".

The argument "rBoxID" is an argument of the "RID" type, which is a data type for designating the data area "RBox". The identifier for specifying the data area "RBox" which stores the result of the processing performed by the server object is set in the argument "rBoxID". That is, the value of the identifier "rBoxID" acquired upon issuing the method "SendWithRBox" is set in the argument "rBoxID".

The argument "msg" is an argument of the "any" type, which is an arbitrary data type. The pointer to the area for storing the received message is set in the argument "msg".

The argument "sizeOfMsg" is an argument of the "size_t" type, which is a data type for specifying the size of the data. The value indicating the size of the area for storing the received message is set in the argument "sizeOfMsg".

The method "Receive" acquires the value of the "sError" type as the return value, which is a data type representing the error code. That is, if the processing of the "Receive" is not correctly completed in issuing this method, the error code indicating the error reason is returned as the return value. If the processing is correctly completed, the value indicating that the processing has been correctly completed is returned as the return value.

2-2-3 Reply( )

sError Reply(in any resultMsg, in size_t sizeOfResultMsg)

The method "Reply" is used when the server object returns the processing result to the client object after the client object has sent the method "SendWithRBox".

The argument "resultMsg" is an argument of the "any" type, which is an arbitrary data type. The pointer to the area for storing the message to be sent to the client object is set in the argument "resultMsg".

The argument "sizeOfResultMsg" is an argument of the "size_t" type, which is a data type for designating the size of the data. The value indicating the size of the message to be sent to the client object is set in the argument "sizeOfResultMsg".

The method "Reply" obtains the value of the "sError" type as the return value, which is a data type representing the error code. That is, if the processing of the "Reply" is not correctly completed in issuing this method, the error code indicating the error reason is returned as the return value. If the processing is correctly completed, the value indicating that the processing has been correctly completed is returned as the return value.

2-2-4 Delegate( )

sError Delegate (in OID destObjID, in Selector meth, in any msg, in size_t sizeOfMsg)

The method "Delegate" is an authorization delegating method for delegating an authorization among objects. More specifically, the method "Delegate" is used when the authorization to return the result of the processing executed by the server object to the client object is delegated among a plurality of server objects.

In the following description, the above-mentioned authorization is referred to as the "reply authorization". Among the server objects, the object that delegates the reply authorization is referred to as an "authorization-delegating object", while the object that is delegated to receive the reply authorization is referred to as an "authorization-delegated object".

The argument "destObjID" is an argument of the "OID" type, which is a data type for specifying the object. The value representing the authorization-delegated object is set in the argument "destObjID".

The argument "meth" is an argument of the "Selector" type, which is a data type for specifying the method. The value indicating the method of the authorization-delegated object for describing the required processing is set in the argument "meth".

The argument "msg" is an argument of the "any" type, which is an arbitrary data type. The pointer to the area for storing the message to be sent to the authorization-delegated object is set in the argument "msg".

The argument "sizeOfMsg" is an argument of the "size_t" type, which is a data size for designating the size of the data. The value representing the size of the message to be sent to the authorization-delegated object is set in the argument "sizeOfMsg".

The method "Delegate" obtains the value of the "sError" type as the return value, which is a data type representing the error code. That is, if the processing of the "Delegate" is not correctly completed in issuing this method, the error code indicating the error reason is returned as the return value. If the processing is correctly completed, the value indicating that the processing has been correctly completed is returned as the return value.

2-3 mDrive metaSpace API

In order to perform future-based message passing in the mDrive metaSpace, the aforementioned operating system provides the following methods as the APIs used for describing the objects operating in the mDrive metaSpace. The API is represented in compliance with the OMG IDL.

sError SendWithContinuation(in OID destObjID, in Selector meth, in any msg, in size_t sizeOfMsg, in Selector contMeth)

sError Kick(in ContID contID, in any msg, in size_t sizeOfMsg)

The above methods are described in detail below.

2-3-1 SendWithContinuation( )

sError SendWithContinuation(in OID destObjID, in Selector meth, in any msg, in size_t sizeOfMsg, in Selector contMeth)

The method "SendWithContinuation" is a message-sending method for sending a message from the client object to the server object. The method "SendWithContinuation" is used when it becomes necessary for the client object to perform a specific method (hereinafter referred to as a "continuation method") upon receiving the processing result of the server object after the client object has sent the message to the server object.

The argument "destObJID" is an argument of the "OID" type, which is a data type for specifying the object. The value for specifying the server object is set in the argument "destObjID".

The argument "meth" is an argument of the "Selector" type, which is a data type for designating the method. The value representing the method of the server object for describing the requested processing is set in the argument "meth".

The argument "msg" is an argument of the "any" type, which is an arbitrary data type. The pointer to the area for storing the message to be delivered to the server object is set in the argument "msg".

The argument "sizeOfMsg" is an argument of the "size_t" type, which is a data type for specifying the size of the data. The value indicating the size of the message to be delivered to the server object is set in the argument "sizeOfMsg".

The argument "contMeth" is an argument of the "Selector" type, which is a data type for designating the method. The value for specifying the continuation method is set in the argument "contMeth".

Upon issuing the method "SendWithContinuation", the data area "Continuation" is reserved by the object "mDriveMailer", which will be discussed later, and the information concerning the continuation method is stored in the data area "Continuation". The data area "Continuation" is an area for storing the continuation method to be executed by the client object, and is referred to as a "future".

The method "SendWithContinuation" acquires the value of the "serror" type as the return value, which is a data type representing the error code. That is, if the processing of the "SendWithContinuation" is not correctly completed in issuing this method, the error code indicating the error reason is returned as the return value. If the processing is correctly completed, the value indicating that the processing has been correctly completed is returned as the return value.

2-3-2 Kick( )

sError Kick(in ContID contID, in any msg, in size_t sizeOfMsg)

The method "Kick" is employed when the server object instructs the client object to execute the continuation method after the client object has issued the method "SendWithContinuation".

The argument "contID" is an argument of the "contID" type, which is a data type for designating the data area "Continuation". The identifier for specifying the data area "Continuation" reserved by the object "mDriveMailer" upon issuing the method "SendWithContinuation" is set in the argument "contID".

The argument "msg" is an argument of the "any" type, which is an arbitrary data type. The pointer to the area for storing the message to be delivered to the client object is set in the argument "msg".

The argument "sizeOfMsg" is an argument of the "size_t" type, which is a data type for specifying the size of the data. The value representing the size of the message to be delivered to the client object is set in the argument "sizeOfMsg".

The method "Kick" obtains the value of the "sError" type as the return value, which is a data type representing the error code. That is, if the processing of the "Kick" is not correctly completed in issuing this method, the error code indicating the error reason is returned as the return value. If the processing is correctly completed, the value indicating that the processing has been correctly completed is returned as the return value.

2-4 Data Area Used for Message Passing

In performing message passing in the mCOOP metaSpace, the aforementioned operating system uses the data area "RBox" as a future, and also uses the data area "DeliveryBoxA" for delivering information from the client object to the server object.

Further, in performing message passing in the mDrive metaSpace, the aforementioned operating system uses the data area "Continuation" as a future, and also uses the data area "DeliveryBoxB" for delivering information from the client object to the server object.

The above-described operating system reserves the data area "Thread" for each object in order to store the information used for managing the execution state of the object. The operating system also stores the information concerning the future in the data area "Thread". The object is operating as a single thread in the mCOOP metaSpace and in the mDrive metaSpace, one thread corresponding to one object. The information concerning the thread is stored in the data area "Thread" as the information for managing the execution state of the object.

The data areas "RBox", "DeliveryBoxA", "Continuation ", "DeliveryBoxB", and "Thread" are data areas used by the operating system for providing the function of the message passing or for managing the object. These data areas are managed by the operating system so that they cannot be directly accessed by the application programs or the device drivers. The above-described data areas are discussed in detail below.

2-4-1 RBox

The data area "RBox" is reserved by the object "mCOOPMailer" upon issuing of the method "SendWithRBox". More specifically, the reservation of the data area "RBox" by the object "mCOOPMailer" is performed by creating the instances of a class (hereinafter referred to as the "class 'RBox'") having attributes shown in Table 1. In Table 1, among the attributes of the class "RBox", only a minimal number of attributes required for implementing the basic form of message passing in the mCOOP metaSpace are shown. Attributes other than the attributes shown in Table 1 may be included.

TABLE 1

| RBox | |
| --- | --- |
| ThreadID | creator |
| bool | ready |
| void* | resultMsg |
| t_size | sizeOfResultMsg |
| sError | status |

Table 1 shows that the class "RBox" has an attribute "creator" of the "ThreadID" type, which is a data type for specifying the data area "Thread" to be set for each object.

The class "RBox" also has an attribute "ready" of the "bool" type, which is a data type for logical values, an attribute "resultMsg" of the "void*" type, which is a data type representing the pointer, and an attribute "sizeOfResultMsg" of the "size_t" type, which is a data type for specifying the size of the data. These attributes are used as the area for storing the result data of the processing executed by the server object.

The class "RBox" further has an attribute "status" of the "sError" type, which is a data type indicating the error code, as the area for storing the data representing the status of the server object.

The identifier for specifying the data area "Thread" corresponding to the object that has created the data area "RBox" (i.e., the client object that has issued the method "SendWithRBox") is set in the attribute "creator". In the mCOOP metaSpace, the object is operating as a single thread, as discussed above, and one data area "Thread" is assigned to one object. Accordingly, if the data area "Thread" is specified by the attribute "creator", the corresponding client object is determined.

The value indicating whether the processing result of the server object has been returned is set in the attribute "ready". In other words, the attribute "ready" is a flag indicating whether the result message to be returned from the server object to the client object is ready.

The pointer to the area for storing the message to be delivered to the client object as the processing result of the server object is set in the attribute "resultMsg".

The value representing the size of the message to be delivered to the client object as the processing result of the server object is set in the attribute "sizeOfResultMsg".

The code indicating the status of the server object as the information to be reported to the client object is set in the attribute "status". More specifically, if the processing of the server object is not correctly completed due to the occurrence of an exception interrupting the normal execution of the server object, the message indicating a failure in performing normal processing is reported to the object "mCOOPMailer" from the object "mCOOPFaultHandler", which will be discussed later. Thus, the error code indicating the status of the server object is set in the attribute "status" by the object "mCOOPMailer". If the processing is correctly executed by the server object, the value indicating that the server object is in a normal status is set in the attribute "status".

When the method "Receive" is issued by the client object, the client object refers to the attribute "ready" so as to determine whether the result of the processing executed by the server object has been returned. If the processing result of the server object has been returned, the client object refers to the attribute "resultMsg" so as to specify the area for storing the message to be delivered to the client object as the processing result of the server object, thereby reading the data having the size indicated by the attribute "sizeOfResultMsg" from the above-mentioned area. As a result, the message to be delivered to the client object is read and delivered to the client object.

2-4-2 DeliveryBoxA

Upon issuing the method "SendWithRBox", the data area "DeliveryBoxA" is reserved by the object "mCOOPMailer" to deliver information from the client object to the server object. More specifically, the reservation of the data area "DeliveryBoxA" by the object "mCOOPMailer" is performed by creating the instances of a class (hereinafter referred to as the "class 'DeliveryBoxA'") having attributes shown in Table 2. In Table 2, among the attributes of the class "DeliveryBoxA", only a minimal number of attributes required for implementing the basic form of message passing in the mCOOP metaSpace are shown. Attributes other than the attributes shown in Table 2 may be included.

TABLE 2

| DeliveryBoxA | |
| --- | --- |
| RID | rBoxID |
| void* | msg |
| t_size | sizeOfMsg |

Table 2 shows that the class "DeliveryBoxA" has an attribute "rBoxID" of the "RID" type, which is a data type for specifying the data area "RBox", an attribute "msg" of the "void*" type, which is a data type indicating the pointer, and an attribute "sizeOfMsg" of the "size_t" type, which is a data size for designating the size of the data.

The identifier for specifying the data area "RBox" used for performing message passing using the data area "DeliveryBoxA" is set in the attribute "rBoxID".

The pointer to the area for storing the message to be delivered from the client object to the server object is set in the attribute "msg".

The value representing the size of the message to be delivered from the client object to the server object is set in the attribute "sizeOfMsg".

By using the data area "DeliveryBoxA" reserved by creating the instances of the class "DeliveryBoxA", the operating system is able to send the information concerning the data area "RBox" together with the message that is sent from the client object to the server object. In other words, by using the data area "DeliveryBoxA", the operating system is able to simultaneously handle the message and the future in the mCOOP metaSpace.

2-4-3 Continuation

Upon issuing the method "SendWithContinuation", the data area "Continuation" is reserved by the object "mDriveMailer" in order to store the information concerning the continuation method therein. More specifically, the reservation of the data area "Continuation" by the object "mDriveMailer" is performed by creating the instances of a class (hereinafter referred to as the "class 'Continuation'") having attributes indicated in Table 3. In Table 3, among the attributes of the class "Continuation", only a minimal number of attributes required for implementing the basic form of message passing in the mDrive metaSpace are shown. Attributes other than the attributes shown in Table 3 may be included.

TABLE 3

| Continuation | |
| --- | --- |
| ThreadID | creator |
| Selector | meth |

Table 3 indicates that the class "Continuation" has an attribute "creator" of the "ThreadID" type, which is a data type for specifying the data area "Thread" set for each object, and an attribute "meth" of the "Selector" type, which is a data type for designating the method.

The identifier for specifying the data area "Thread" corresponding to the object that has created the data area "Continuation" (i.e., the client object that has issued the method "SendWithContinuation") is set in the attribute "creator". In the mDrive metaSpace, the object is operating as a single thread, as discussed above, and one data area "Thread" corresponds to one object. Accordingly, when the data area "Thread" is specified by the attribute "creator", the corresponding client object is determined.

The value representing the continuation method of the client object is set in the attribute "meth".

When the method "Kick" is issued by the server object, the client object refers to the attribute "meth" so as to specify the continuation method of the client object, thereby starting the specified continuation method.

2-4-4 DeliveryBoxB

Upon issuing the method "SendWithContinuation", the data area "DeliveryBoxB" is reserved by the object "mDriveMailer" in order to deliver information from the client object to the server object. More specifically, the reservation of the data area "DeliveryBoxB" by the object "mDriveMailer" is conducted by creating the instances of a class (hereinafter referred to as the "class 'DeliveryBoxB'") having attributes indicated in Table 4. In Table 4, among the attributes of the class "DeliveryBoxB", only a minimal number of attributes required for implementing the basic form of message passing in the mDrive metaSpace are shown. Attributes other than the attributes shown in Table 4 may be included.

TABLE 4

| DeliveryBoxB | |
| --- | --- |
| ContID | contID |
| void* | msg |
| t_size | sizeOfMsg |

Table 4 shows that the class "DeliveryBoxB" has an attribute "contID" of the "ContID" type, which is a data type for designating the data area "Continuation", an attribute "msg" of the "void*" type, which is a data type indicating the pointer, and an attribute "sizeOfMsg" of the "size_t" type, which is a data type for specifying the size of the data.

The identifier for specifying the data area "Continuation" used for message passing employing the data area "DeliveryBoxB" is set in the attribute "contID".

The pointer to the area for storing the message to be delivered from the client object to the server object is set in the attribute "msg".

The value indicating the size of the message to be delivered from the client object to the server object is set in the attribute "sizeOfMsg".

By using the data area "DeliveryBoxB" reserved by creating the instances of the class "DeliveryBoxB", the operating system is able to send the information concerning the data area "Continuation" together with the message that is sent from the client object to the server object. In other words, by using the data area "DeliveryBoxB", the operating system is able to simultaneously handle the message and the future in the mDrive metaSpace.

2-4-5 Thread

In the mCOOP metaSpace and in the mdrive metaSpace, as noted above, the object is operating as a single thread, and one thread is assigned to one object. The information concerning each thread is stored in the data area "Thread" as the information for managing the execution state of the object. That is, the operating system reserves the data area "Thread" for each object in order to store the information for managing the execution state of the object therein.

The information for managing the execution state of the object, for example, the information indicating whether the object is in the waiting state or in the execution state, is stored in the data area "Thread". In performing future-based message passing, the information concerning the future is also stored in the data area "Thread".

More specifically, it is now assumed that the object is operating in the mCOOP metaSpace. In performing future-based message passing, the identifier "rBoxID" for specifying the data area "RBox" used for message passing is stored by the object "mCOOPMailer", as the information concerning the future, in the data area "Thread" corresponding to the object.

It is now assumed that the object is operating in the mDrive metaSpace. In conducting future-based message passing, the identifier "contID" for specifying the data area "Continuation" used for message passing is stored by the object "mDriveMailer" in the data area "Thread" corresponding to the object.

2-5 Message Passing

A detailed description is given below by taking specific scenarios, as examples, of message passing performed by using the aforementioned methods and data areas.

FIGS. 5 through 9 illustrate a shift of processing and message exchange performed in message passing. In FIGS. 5 through 9, the single-dot-chain arrows designate a shift of processing and message exchange within the operating system, while the solid arrows indicate a shift of processing and message exchange from the point of view of the application program.

2-5-1 Message Passing Using SendWithRBox( )

A description is given below of message passing performed by using the method "SendWithRBox" in the mCOOP metaSpace when the processing proceeds in a normal condition and when an exception occurs.

2-5-1-1 When Processing is Executed in a Normal Condition

Figure 5:
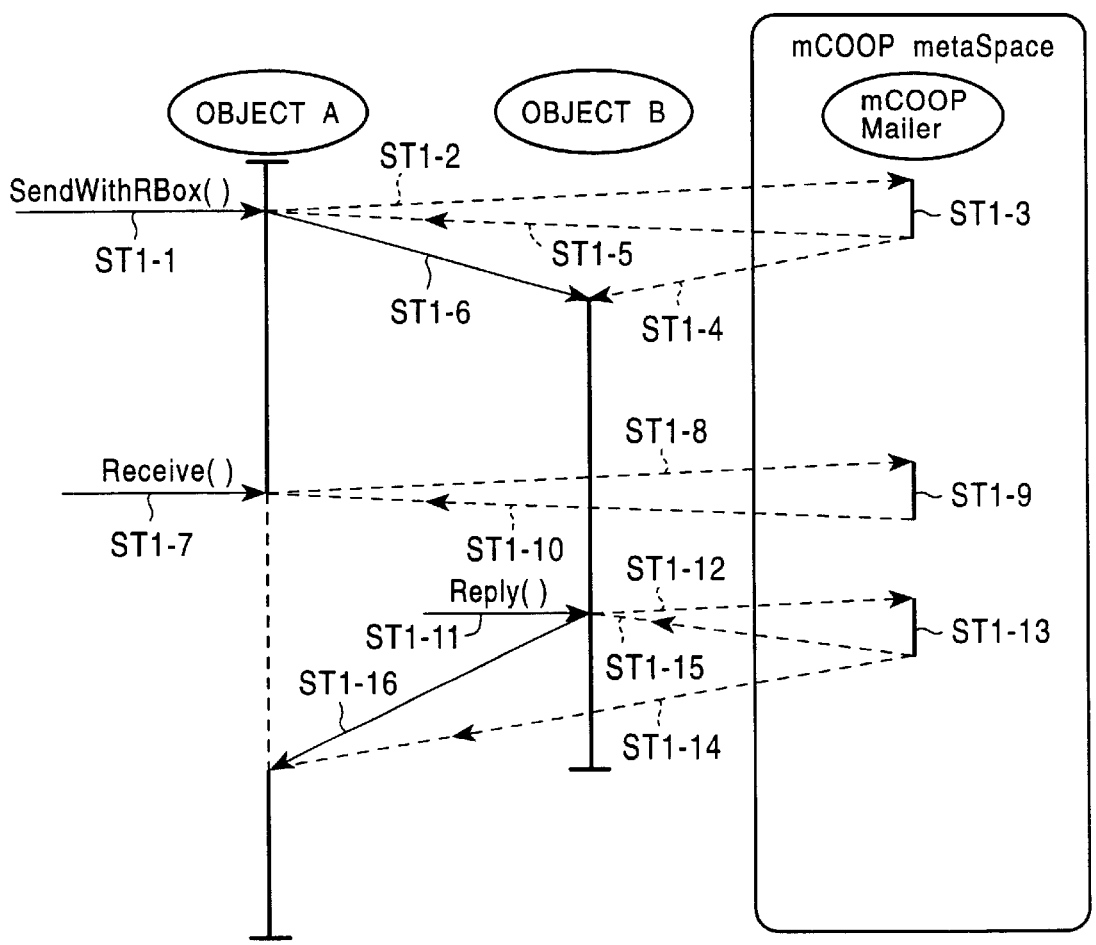
FIG. 5 illustrates an example of a scenario of message passing performed by using the method "SendWithRBox" when the processing proceeds in a normal condition.

A description is first given, with reference to FIG. 5, of message passing performed by using the method "SendWithRBox" in the mCOOP metaSpace when the processing is executed in a normal condition without the occurrence of an exception.

FIG. 5 illustrates a basic scenario of message passing performed by using the method "SendWithRBox" between an object A operating as an application program in the mCOOP metaSpace and an object B operating as an application program in the mCOOP metaSpace. That is, in this example, the object A is a client object, while the object B is a server object.

When the object A issues the method "SendWithRBox", as indicated by ST1-1, the processing is shifted to the object "mCOOPMailer", as represented by the single-dot-chain arrow ST1-2, and the processing in accordance with the method "SendWithRBox" is executed by the object "mCOOPMailer", as designated by ST1-3.

The object "mCOOPMailer" first reserves the data area "RBox" for storing the result of processing executed by the server object (in this example, the object B), and sets the identifier for specifying the data area "Thread" corresponding to the object A in the attribute "creator" of the data area "RBox".

The object "mCOOPMailer" then reserves the data area "DeliveryBoxA", and stores the identifier "rBoxID" for specifying the data area "RBox" and the message sent by the method "SendWithRBox" therein.

The identifier "rBoxID" for designating the data area "RBox" is stored in the data area "DeliveryBoxA", and more specifically, the value of the identifier "rBoxID" for specifying the data area "RBox" is set in the attribute "rBoxID" of the data area "DeliveryBoxA".

The message sent by the method "SendWithRBox" is stored in the data area "DeliveryBoxA", and more specifically, the value of the argument "msg" of the method "SendWithRBox" is set in the attribute "msg" of the data area "DeliveryBoxA", and also, the value of the argument "sizeOfMsg" of the method "SendWithRBox" is set in the attribute "sizeOfMsg" of the data area "DeliveryBoxA".

Thereafter, the object "mCOOPMailer" delivers to the object B, as indicated by the single-dot-chain arrow ST1-4, the data stored in the data area "DeliveryBoxA", i.e., the message sent by the method "SendWithRBox", and the identifier "rBoxID" for specifying the reserved data area "RBox", thereby starting the method of the object B.

In this case, only the message is delivered to the method of the object B, and the identifier "rBoxID" is stored in the data area "Thread" corresponding to the object B. In other words, the identifier "rBoxID" to be delivered to the object B is under the management of the operating system, and it is only the message that has been sent to the object B, from the point of view of the application program.

In starting the method of the object B by delivering the data stored in the data area "DeliveryBoxA" from the object "mCOOPMailer" to the object B, the object B is specified by the argument "destObjID" of the method "SendWithRBox", and the method of the object B is designated by the argument "meth" of the method "SendWithRBox".

Upon completing the aforementioned processing, as represented by the single-dot-chain arrow ST1-5, the object "mCOOPMailer" returns to the object A the identifier "rBoxID" for specifying the reserved data area "RBox", and also returns to the object A the value indicating that the processing has been correctly completed as the return value to the method "SendWithRBox". The object "mCOOPMailer" then enables the object A to restart processing. The object A is now ready to execute processing, and if there is any remaining processing, the object A restarts the processing.

According to the above-described processing, the message is delivered from the object A to the object B, as indicated by the solid arrow ST1-6, and it is as if the object A and the object B were concurrently operating, from the point of view of the application programs.

Subsequently, when the object A issues the method "Receive", as designated by ST1-7, the processing is shifted to the object "mCOOPMailer", as represented by the single-dot-chain arrow ST1-8, and the processing in response to the method "Receive" is executed by the object "mCOOPMailer", as indicated by ST1-9. More specifically, the object "mCOOPMailer" refers to the data area "RBox" designated by the argument "rBoxID" of the method "Receive". If the result of the processing executed by the object B is stored in the data area "RBox", the object "mCOOPMailer" delivers the result to the object A. If the result of the processing performed by the object B is not stored in the data area "RBox", the object "mCOOPMailer" shifts the state of the object A from the execution state to the waiting state.

In this example, when the object A has issued the method "Receive", the object B has not issued the method "Reply", and thus, the result of the processing executed by the object B is not yet stored in the data area "RBox". Accordingly, the object "mCOOPMailer" informs the object A, as represented by the single-dot-chain arrow ST1-10, that the processing result of the object B is not yet stored in the data area "RBox", and shifts the state of the object A from the execution state to the waiting state.

Thereafter, when the object B issues the method "Reply", as indicated by ST1-11, the processing is shifted to the object "mCOOPMailer", as designated by the single-dot-chain-arrow ST1-12, and the processing in accordance with the method "Reply" is executed by the object "mCOOPMailer", as indicated by ST1-13. More specifically, if the object A has already issued the method "Receive", the object "mCOOPMailer" delivers the result of the processing executed by the object B to the object A. If the object A has not yet issued the method "Receive", the object "mCOOPMailer" stores the processing result of the object B in the data area "RBox".

In this example, when the object B has issued the method "Reply", the object A has already issued the method "Receive". Accordingly, the object "mCOOPMailer" directly delivers the processing result of the object B to the object A, as represented by the single-dot-chain arrow ST1-14, without storing the processing result in the data area "RBox". Upon completing the processing in a normal condition for the delivery of the processing result of the object B to the object A, the object "mCOOPMailer" returns to the object B, as represented by the single-dot-chain arrow ST1-15, the value indicating that the processing has been correctly completed as the return value to the method "Reply". The object "mCOOPMailer" then enables the object B to restart processing. The object B is now ready to perform processing, and if there is any remaining processing, the object B restarts the processing.

According to the aforementioned processing, the result of the processing performed by the object B is delivered to the object A, as indicated by the solid arrow ST1-16, and it is as if the object A and the object B were concurrently operating, from the point of view of the application programs.

In the example shown in FIG. 5, the method "Receive" has been issued before the method "Reply" is issued. Alternatively, the method "Receive" may be issued after the method "Reply" has been issued. In this case, the object A is able to immediately receive the result of the processing executed by the object B without entering the waiting state.

If the object A issues the method "Receive" after the object B has issued the method "Reply", the object "mCOOPMailer" executes the following processing. The object "mCOOPMailer" stores the processing result of the object B in the data area "RBox" upon issuing the method "Reply" by the object B. Then, when the object A issues the method "Receive", the "mCOOPMailer" immediately reads the processing result of the object B from the data area "RBox" and delivers it to the object A.

The result of the processing executed by the object B is stored in the data area "RBox". More specifically, the value indicating that the processing result of the object B has been returned is set in the attribute "ready" of the data area "RBox", and the pointer to the area for storing the message to be delivered to the object A as the processing result of the object B, i.e., the pointer represented by the argument "resultMsg" of the method "Reply", is set in the attribute "resultMsg" of the data area "RBox", and also, the value indicating the size of the message to be delivered to the object A as the processing result of the object B, i.e., the value represented by the argument "sizeOfResultMsg" of the method "Reply", is set in the attribute "sizeOfResultMsg" of the data area "RBox".

In reading the processing result of the object B from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object B to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Reply" has been issued, as well as when the method "Receive" has been issued before the method "Reply" is issued, the result of the processing executed by the object B is delivered to the object A, and it is as if the object A and the object B were concurrently operating.

2-5-1-2 When an Exception Occurs

A description is now given below, with reference to FIG. 6, of message passing performed by using the method "SendWithRBox" in the mCOOP metaSpace when an exception, which interrupts the normal processing of the server object, occurs.

Figure 6:
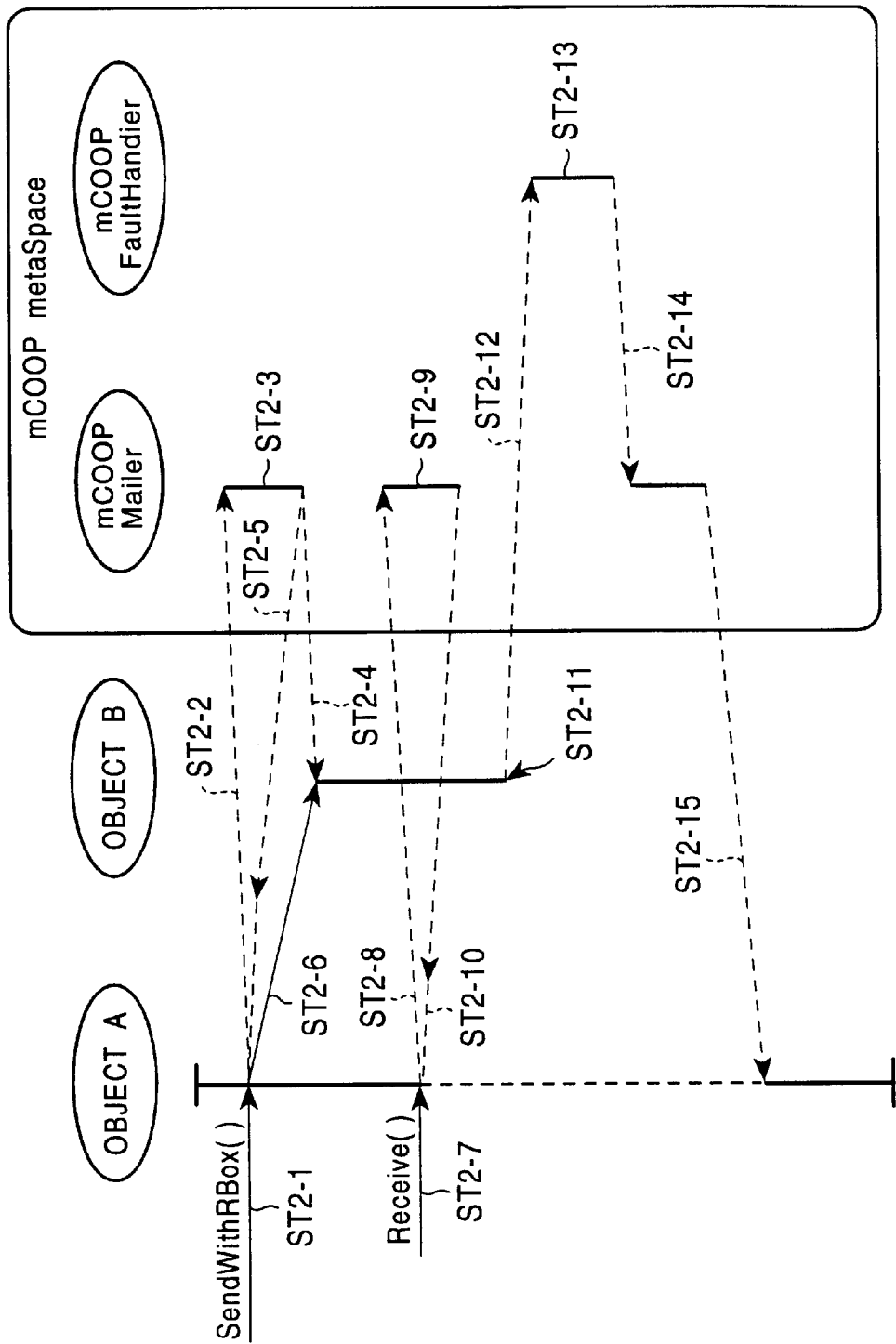
FIG. 6 illustrates an example of a scenario of message passing performed by using the method "SendWithRBox" when an exception occurs.

FIG. 6 illustrates a basic scenario of message passing performed by using the method "SendWithRBox" in the mCOOP metaSpace between an object A operating as an application program in the mCOOP metaSpace and an object B operating as an application program in the mCOOP metaSpace. That is, in this example, the object A is a client object, while the object B is a server object. It is now assumed in this scenario that an exception occurs with respect to the object B after the method "Receive" has been issued by the object A, and the object B becomes inoperable.

In this scenario, steps ST2-1, ST2-2, ST2-3, ST2-4, ST2-5, ST2-6, ST2-7, ST2-8, ST2-9, and ST2-10 shown in FIG. 6 are respectively similar to steps ST1-1, ST1-2, ST1-3, ST1-4, ST1-5, ST1-6, ST1-7, ST1-8, ST1-9, and ST1-10 shown in FIG. 5, and an explanation thereof will thus be omitted.

In this scenario, after processing proceeds to step ST2-10, when the object A is in the waiting state, and when the object B is executing processing, an exception, which interrupts normal processing of the object B, occurs.

When an exception, which interrupts the normal processing of the object B, occurs, as indicated by ST2-11, the processing is shifted to the object "mCOOPFaultHandler", as represented by the single-dot-chain arrow ST2-12, and predetermined exception handling is performed by the object "mCOOPFaultHandler", as indicated by ST2-13. Then, the object "mCOOPFaultHandler" reports to the object "mCOOPMailer", as indicated by the single-dotchain arrow ST2-14, that the object B has become inoperable due to the occurrence of an exception.

At this time, the object A is in the waiting state after issuing the method "Receive". Then, the object "mCOOP-Mailer" returns to the object A, as represented by the single-dot-chain arrow ST2-15, the error code indicating that the object B has become inoperable due to the occurrence of an exception as the return value to the method "Receive", and also enables the object A to restart processing. The object A is now ready to execute processing, and if there is any remaining processing, the object A restarts the processing.

According to the aforementioned processing, although the object A is unable to receive a result message, which would be expected to be obtained from the object B, it receives the error code, as the return value, indicating that the object B has become inoperable, and is able to resume the execution of processing. The object A then performs the processing in response to the occurrence of an error.

For example, the message indicating that an exception has occurred to the object B may be displayed on an image display unit, and the user may be instructed to reset the processing. Alternatively, an object as an alternative to the object B may be downloaded from an external source via a network, and message passing may be performed again.

In the scenario shown in FIG. 6, an exception occurs with respect to the object B after the method "Receive" has been issued by the object A. However, an exception may occur to the object B before the method "Receive" is issued by the object A.

If an exception has occurred to the object B before the method "Receive" is issued by the object A, the object "mCOOPMailer" sets in the attribute "status" of the data area "RBox" the error code indicating that the object B has become inoperable due to the occurrence of an exception.

Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to resume processing. In a manner similar to the previous scenario, the object A is now ready to perform processing, and if there is any remaining processing, the object A restarts the processing.

As described above, the error code indicating that the object B has become inoperable due to the occurrence of an exception is set in the attribute "status" of the data area "RBox". This prevents the object A from wastefully entering the waiting state upon issuing the method "Receive", and the object A immediately recognizes that the object B has become inoperable due to the occurrence of an exception.

In the foregoing scenarios, an exception has occurred to the object B. In other cases, if a result message cannot be returned to the object A for some reason, the error code is set in the attribute "status" of the data area "RBox". With this arrangement, even if a result message cannot be returned to the object A for some reason, the error code is returned to the object A so that and the object A can be resumed to the operable state from the waiting state, which would otherwise cause the object A to enter the waiting state and would stop the system.

2-5-2 Message Passing Using Delegate( )

A description is given below, with reference to FIG. 7, of message passing performed by using the method "Delegate" employed when a processing request is received and a processing result is returned by different server objects.

Figure 7:
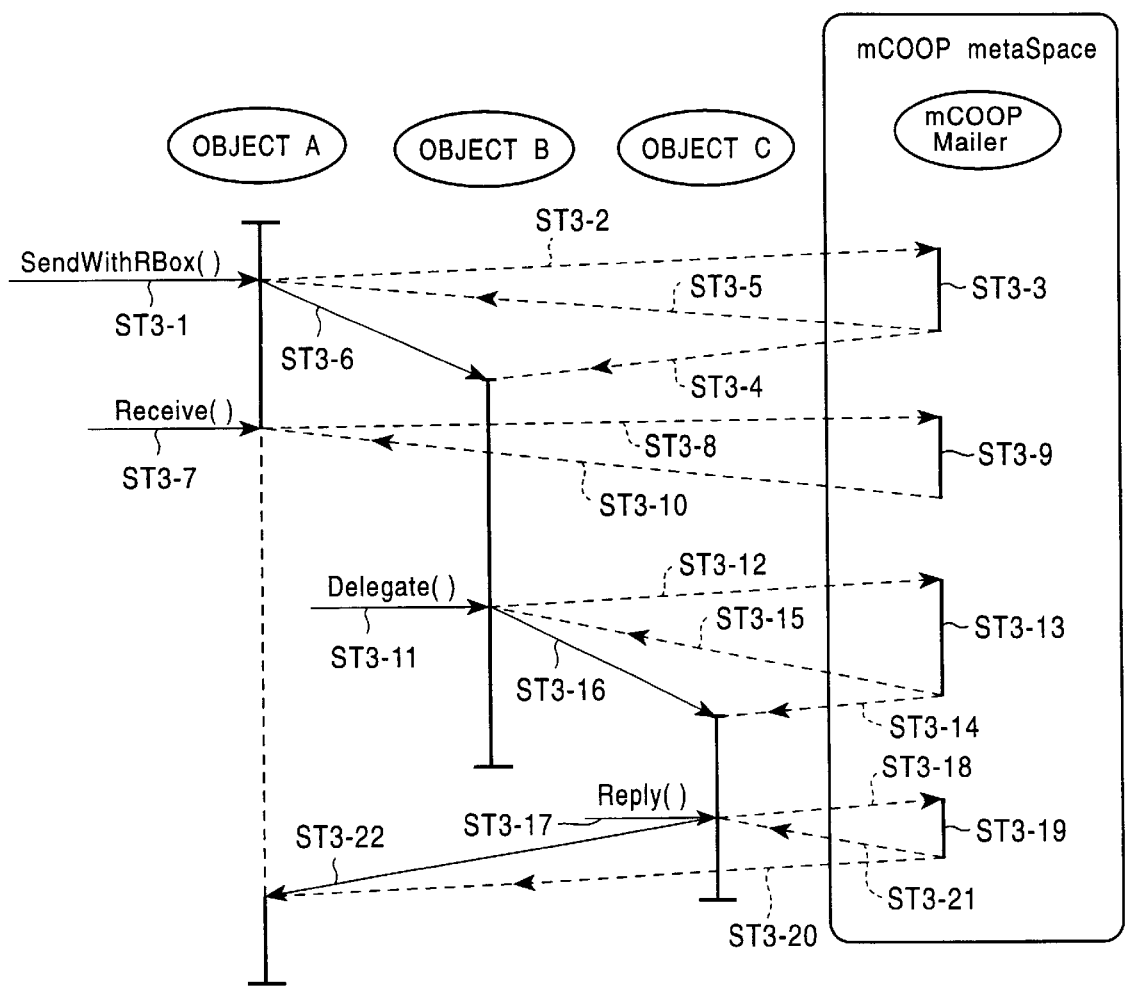
FIG. 7 illustrates an example of a scenario of message passing performed in the server objects in which a processing request is received and a processing result is returned by different server objects.

FIG. 7 illustrates a scenario of message passing performed in the mCOOP metaSpace among an object A, an object B, and an object C, all of which are operating as application programs in the mCOOP metaSpace. In this scenario, the reply authorization is delegated from the object B to the object C.

That is, in this example, the object A is a client object, while the object B and the object C are server objects. The object B delegates the object C to return the processing result to the object A. That is, the object B serves as a server object and also as an authorization-delegating object. The object C serves as a server object and also as an authorization-delegated object.

When the object A issues the method "SendWithRBox", as indicated by ST3-1, the processing is shifted to the object "mCOOPMailer", as represented by the single-dot-chain arrow ST3-2, and the processing in accordance with the method "SendWithRBox" is executed by the object "mCOOPMailer", as designated by ST3-3.

The object "mCOOPMailer" first reserves the data area "RBox" for storing the result of the processing executed by the server object, and then sets the identifier for specifying the data area "Thread" corresponding to the object A in the attribute "creator" of the data area "RBox".

Subsequently, the object "mCOOPMailer" reserves the data area "DeliveryBoxA", and stores the identifier "rBoxID" for designating the data area "RBox" and the message sent by the method "SendWithRBox" therein.

The identifier "rBoxID" for specifying the data area "RBox" is stored in the data area "DeliveryBoxA". More specifically, the value of the identifier "rBoxID" for designating the data area "RBox" is set in the attribute "rBoxID" of the data area "DeliveryBoxA".

The message sent by the method "SendWithRBox" is stored in the data area "DeliveryBoxA". More specifically, the value of the argument "msg" of the method "SendWithRBox" is set in the attribute "msg" of the data area "DeliveryBoxA", and also, the value of the argument "sizeOfMsg" of the method "SendWithRBox" is set in the attribute "sizeOfMsg" of the data area "DeliveryBoxA".

Thereafter, the object "mCOOPMailer" delivers to the object B, as indicated by the single-dot-chain arrow ST3-4, the data stored in the data area "DeliveryBoxA", i.e., the message sent by the method "SendWithRBox", and the identifier "rBoxID" for designating the reserved data area "RBox" thereby starting the method of the object B.

In this case, only the message is sent to the method of the object B, and the identifier "rBoxID" is stored in the data area "Thread" corresponding to the object B. In other words, the identifier "rBoxID" to be delivered to the object B is under the management of the operating system, and it is only the message that has been sent to the object B, from the point of view of the application program.

In starting the method of the object B by delivering the data stored in the data area "DeliveryBoxA" from the object "mCOOPMailer" to the object B, the object B is specified by the argument "destObjID" of the method "SendWithRBox", and the method of the object B is designated by the argument "meth" of the method "SendWithRBox".

Upon completing the aforementioned processing, as designated by the single-dot-chain arrow ST3-5, the object "mCOOPMailer" returns the identifier "rBoxID" for specifying the reserved data area "RBox" to the object A, and also returns to the object A the value indicating that the processing has been correctly completed, as the return value to the method "SendWithRBox". The object "mCOOPMailer" then enables the object A to restart processing. The object A is now ready to execute processing, and if there is any remaining processing, the object A restarts the processing.

According to the above-described processing, the message has been sent from the object A to the object B, as represented by the solid arrow ST3-6, and it is as if the object A and the object B were concurrently operating, from the point of view of the application programs.

Subsequently, upon issuing the method "Receive" by the object A, as indicated by ST3-7, the processing is shifted to the object "mCOOPMailer", as designated by the single-dot-chain arrow ST3-8, and the processing in response to the method "Receive" is executed by the object "mCOOPMailer", as designated by ST3-9. More specifically, the object "mCOOPMailer" refers to the data area "RBox" specified by the argument "rBoxID" of the method "Receive". If the result of the processing performed by the server object is stored in the data area "RBox", the "mCOOPMailer" delivers the result to the object A. If the processing result of the server object is not stored in the data area "RBox", the object "mCOOPMailer" changes the state of the object A from the execution state to the waiting state.

In this example, when the object A has issued the method "Receive", the server object has not issued the method "Reply". Accordingly, the result of the processing executed by the server object is not yet stored in the data area "RBox". Thus, the object "mCOOPMailer" reports to the object A, as indicated by the single-dot-chain arrow ST3-10, that the processing result of the server object is not stored in the data area "RBox", and changes the state of the object A from the execution state to the waiting state.

Thereafter, when the object B issues the method "Delegate", as indicated by ST3-11, the processing is shifted to the object "mCOOPMailer", as represented by the single-dot-chain arrow ST3-12, and the processing in accordance with the method "Delegate" is performed by the object "mCOOPMailer", as designated by ST3-13.

More specifically, the object "mCOOPMailer" first reserves the data area "DeliveryBoxA". The object "mCOOPMailer" then reads the identifier "rBoxID" stored in the data area "Thread" corresponding to the object B, and sets the value of the identifier "rBoxID" in the attribute "rBoxID" of the data area "DeliveryBoxA".

Simultaneously, the identifier "rBoxID" stored in the data area "Thread" corresponding to the object B is erased, thereby depriving the object B of the reply authorization. That is, the object B loses the reply authorization by issuing the method "Delegate", and delegates the reply authorization to the object C. Since the object B has lost the reply authorization, it is unable to issue the method "Reply". In other words, the object B has issued the method "Delegate" instead of the method "Reply".

The object "mCOOPMailer" also stores the message sent by the method "Delegate" in the data area "DeliveryBoxA". More specifically, the value of the argument "msg" of the method "Delegate" is set in the attribute "msg" of the data area "DeliveryBoxA", and also, the value of the argument "sizeOfMsg" of the method "Delegate" is set in the attribute "sizeOfMsg" of the data area "DeliveryBoxA".

The object "mCOOPMailer" then delivers to the object C, as indicated by the single-dot-chain arrow ST3-14, the data stored in the data area "DeliveryBoxA", i.e., the message sent by the method "Delegate", and the identifier "rBoxID" for specifying the data area "RBox", thereby starting the method of the object C.

In this case, only the message has been sent to the method of the object C, and the identifier "rBoxID" is stored in the data area "Thread" corresponding to the object C. In other words, the identifier "rBoxID" to be delivered to the object C is under the management of the operating system, and it is only the message that has been sent to the object B, from the point of view of the application program.

In starting the method of the object C by delivering the data stored in the data area "DeliveryBoxA" from the object "mCOOPMailer" to the object C, the object C is specified by the argument "destObjID" of the method "Delegate", and the method of the object C is designated by the argument "meth" of the method "Delegate".

Upon completing the aforementioned processing, the object "mCOOPMailer" returns to the object B, as indicated by the single-dot-chain arrow ST3-15, the value indicating that the processing has been correctly completed, as the return value to the method "Delegate", and then enables the object B to restart processing. The object B is now ready to execute processing, and if there is any remaining processing, the object B restarts the processing.

According to the aforementioned processing, the reply authorization is delegated to the object C from the object B, as represented by the solid arrow ST3-16, and it is as if the object B and the object C were concurrently operating, from the point of view of the application programs.

Subsequently, when the object C issues the method "Reply", as indicated by ST3-17, the processing is shifted to the object "mCOOPMailer", as designated by the single-dot-chain arrow ST3-18, and the processing in response to the method "Reply" is executed by the object "mCOOPMailer", as represented by ST3-19. More specifically, if the object A has already issued the method "Receive", the object "mCOOPMailer" immediately delivers the processing result of the object C to the object A. If the object A has not yet issued the method "Receive", the object "mCOOPMailer" stores the processing result of the object C in the data area "RBox".

In this example, when the object C has issued the method "Reply", the object A has already issued the method "Receive". Accordingly, the object "mCOOPMailer" immediately delivers to the object A, as indicated by the single-dot-chain arrow ST3-20, the processing result of the object C without storing it in the data area "RBox". Upon completing the processing for delivering the processing result of the object C to the object A in a normal condition, the object "mCOOPMailer" returns to the object C, as represented by the single-dot-chain arrow ST3-21, the value indicating that the processing has been correctly completed, as the return value to the method "Reply". The object "mCOOPMailer" then enables the object C to restart processing. The object C is now ready to execute processing, and if there is any remaining processing, the object C restarts the processing.

According to the above-described processing, the result of the processing executed by the object C has been sent to the object A, as represented by the solid arrow ST3-22, and it is as if the object A and the object C were concurrently operating, from the point of view of the application programs.

In the example shown in FIG. 7, the method "Receive" has been issued before the method "Reply" is issued. Alternatively, the method "Receive" may be issued after the method "Reply" has been issued. In this case, the object A is able to immediately receive the result of the processing executed by the object C without entering the waiting state.

If the object A issues the method "Receive" after the object C has issued the method "Reply", the object "mCOOPMailer" executes the following processing. The object "mCOOPMailer" stores the processing result of the object C in the data area "RBox" when the method "Reply" is issued by the object C. Then, when the object A issues the method "Receive", the "mCOOPMailer" immediately reads the processing result of the object C from the data area "RBox" and delivers it to the object A.

The result of the processing executed by the object C is stored in the data area "RBox". More specifically, the value indicating that the processing result of the object C has been returned is set in the attribute "ready" of the data area "RBox", and the pointer to the area for storing the message to be delivered to the object A as the processing result of the object C, i.e., the pointer represented by the argument "resultMsg" of the method "Reply", is set in the attribute "resultMsg" of the data area "RBox". Further, the value indicating the size of the message to be delivered to the object A as the processing result of the object C, i.e., the value represented by the argument "sizeOfResultMsg" of the method "Reply", is set in the attribute "sizeOfResultMsg" of the data area "RBox".

In reading the processing result of the object C from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object C to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Reply" has been issued, as well as when the method "Receive" has been issued before the method "Reply" is issued, the result of the processing executed by the object C is delivered to the object A, and it is as if the object A and the object C were concurrently operating.

According to the foregoing description, by introducing the method "Delegate" as an API used for describing an object, even if there are a plurality of server objects, the reply authorization can be delegated among the server objects. In other words, by introducing the method "Delegate", even if there are a plurality of server objects, and even if a server object that receives a processing request is different from a server object that returns a processing result, message passing can be suitably performed.

Additionally, with the introduction of the method "Delegate", in delegating the reply authorization among a plurality of server objects, the data area "RBox" and the identifier "rBoxID" for specifying the data area "RBox" are transparent to the application programs. This enhances the simplicity of the development of application programs.

If the object delegated to possess the reply authorization by the method "Delegate" (in this example, the object C) becomes inoperable due to, for example, the occurrence of an error, and is unable to acquire a result, exception handling is performed in a manner similar to the scenario shown in FIG. 6.

More specifically, in the example shown in FIG. 7, if the object C delegated to possess the reply authorization by the method "Delegate" becomes inoperable during execution due to the occurrence of an error and is unable to obtain a result, the processing is shifted to the object "mCOOPFaultHandler", and predetermined exception handling is performed by the object "mCOOPFaultHandler". The object "mCOOPFaultHandler" then reports to the object "mCOOPMailer" that the object C has become inoperable due to the occurrence of an error.

In this case, if the object A has already issued the method "Receive" and is in the waiting state, the object "mCOOPMailer" returns to the object A the error code indicating that the object C has become inoperable due to the occurrence of an error, as the return value to the method "Receive", and then enables the object A to restart processing. Thus, the object A is ready to execute processing, and if there is any remaining processing, the object A restarts the processing.

On the other hand, if an exception has occurred with respect to the object C before the object A issues the method "Receive", the object "mCOOPMailer" sets in the attribute "status" of the data area "RBox" the error code indicating that the object C has become inoperable due to the occurrence of an error. Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to restart processing. Accordingly, the object A is ready to execute processing, and if there is any remaining processing, the object A restarts the processing.

According to the aforementioned processing, even if the object C delegated to possess the reply authorization is unable to return a result message to the object A for some reason, the object A can resume the execution state from the waiting state, which would otherwise cause the object A to enter the waiting state and would stop the system.

2-5-3 Message Passing Using SendWithContinuation( )

A description is now given below, with reference to FIG. 8, of message passing performed by using the method "SendWithContinuation" in the mDrive metaSpace.

Figure 8:
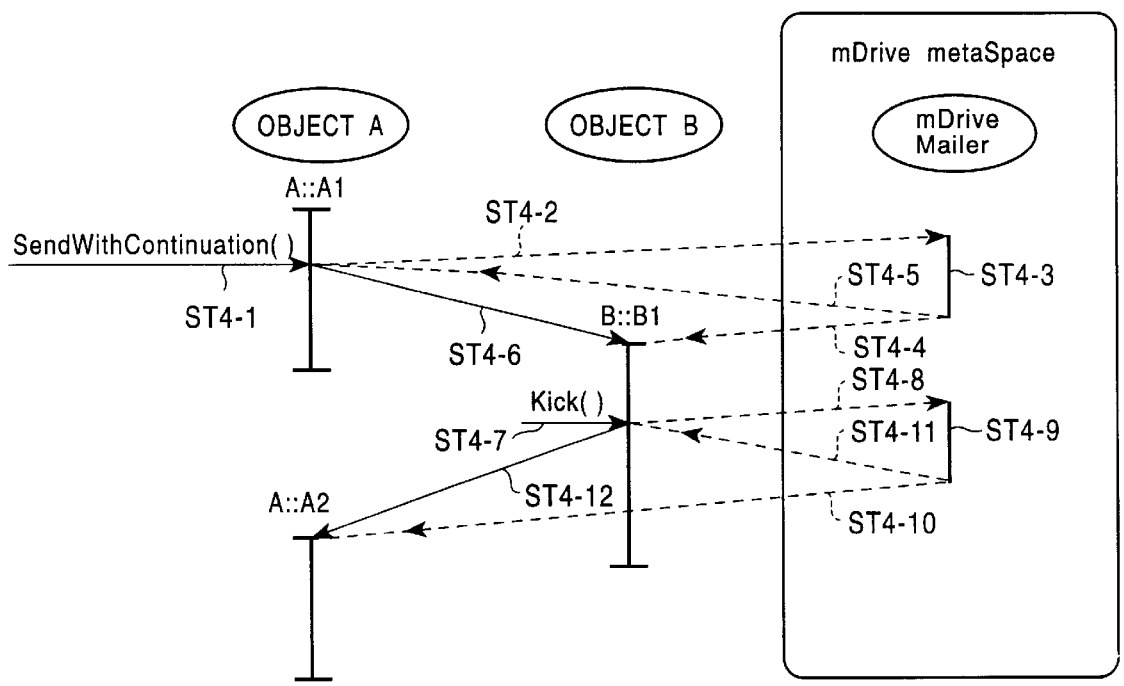
FIG. 8 illustrates an example of a scenario of message passing performed by using the method "SendWithContinuation"

FIG. 8 illustrates a basic scenario of message passing performed in the mDrive metaSpace between an object A operating as a device driver in the mDrive metaSpace and an object B operating as a device driver in the mDrive metaSpace. That is, in this example, the object A is a client object, while the object B is a server object.

In FIG. 8, the method of the object A that issues the method "SendWithContinuation" is indicated by "A::A1", while the method of the object B that is started by the method "SendWithContinuation" and also issues the method "Kick" is represented by "B::B1". Moreover, the method of the object A started by the method "Kick", i.e., the continuation method, is indicated by "A::A2".

When the object A issues the method "SendWithContinuation" within the method "A::A1", as indicated by ST4-1, the processing is shifted to the object "mDriveMailer", as represented by the single-dot-chain arrow ST4-2, and the processing in accordance with the method "SendWithContinuation" is performed by the object "mDriveMailer", as designated by ST4-3.

The object "mDriveMailer" first reserves the data area "Continuation", and stores the information concerning the continuation method therein. More specifically, the value of the identifier for specifying the data area "Thread" corresponding to the object A is set in the attribute "creator" of the data area "Continuation", and also, the value of the argument "contMeth" of the method "SendWithContinuation" is set in the attribute "meth" of the data area "Continuation".

The object "mDriveMailer" also reserves the data area "DeliveryBoxB", and stores the identifier "contID" for designating the data area "Continuation", and the message sent by the method "SendWithContinuation" therein. The identifier "contID" for specifying the data area "Continuation" is stored in the data area "DeliveryBoxB", and more specifically, the value of the identifier "contID" for specifying the data area "Continuation" is set in the attribute "contID" of the data area "DeliveryBoxB". Moreover, the message sent by the method "SendWithContinuation" is stored in the data area "DeliveryBoxB", and more specifically, the value of the argument "msg" of the method "SendWithContinuation" is stored in the attribute "msg" of the data area "DeliveryBoxB", and also, the value of the argument "sizeOfMsg" of the method "SendWithContinuation" is set in the attribute "sizeOfMsg" of the data area "DeliveryBoxB".

Thereafter, the object "mDriveMailer" delivers to the object B, as indicated by the single-dot-chain arrow ST4-4, the data stored in the data area "DeliveryBoxB", i.e., the message sent by the method "SendWithContinuation", and the identifier "contID" for specifying the data area "Continuation", thereby starting the method "B::B1" of the object B.

In starting the method "B::B1" of the object B by delivering the data stored in the data area "DeliveryBoxB" from the object "mDriveMailer" to the object B, the object B is specified by the argument "destObjID" of the method "SendWithContinuation", and the method "B::B1" of the object B is designated by the argument "meth" of the method "SendWithContinuation".

Upon completing the above-described processing, the object "mDriveMailer" returns to the object A, as indicated by the single-dot-chain arrow ST4-5, the value indicating that the processing has been correctly completed, as the return value to the method "SendWithContinuation", and then enables the object A to restart processing. Accordingly, the object A is ready to execute processing, and if there is any remaining processing, the object A restarts the processing.

According to the aforementioned processing, the message has been sent from the object A to the object B, as indicated by the solid arrow ST4-6, and it is as if the object A and the object B were concurrently operating, from the point of view of the device drivers.

Thereafter, the object B executes the method "B::B1", and upon completing the processing requested by the object A, the object B issues the method "Kick", as indicated by ST4-7. Upon issuing the method "Kick", the processing is shifted to the object "mDriveMailer", as represented by the single-dot-chain arrow ST4-8, and the processing in response to the method "Kick" is performed by the object "mDriveMailer", as indicated by ST4-9.

More specifically, the object "mDriveMailer" first specifies the data area "Continuation" based on the argument "contID" of the method "Kick", and then reads the information stored in the data area "Continuation".

As the attribute "creator", the value of the identifier designating the data area "Thread" corresponding to the object A is stored in the data area "Continuation". According to the identifier, the object "mDriveMailer" designates the object A as the object to be started in response to the method "Kick". The value of the argument "contMeth" of the method "SendWithContinuation", i.e., the value specifying the continuation method "A::A2", is set in the attribute "meth" of the data area "Continuation". According to the argument "contMeth", the object "mDriveMailer" specifies the method "A::A2" as the continuation method to be started in response to the method "Kick".

The object "mDriveMailer" then starts, as designated by the single-dot-chain arrow ST4-10, the method of the object specified by the information stored in the data area "Continuation", i.e., the method "A::A2" of the object A, as the continuation method. In starting the continuation method "A::A2", the message to be delivered to the continuation method "A::A2" is designated by the arguments "msg" and "sizeOfMsg" of the method "Kick".

Upon correctly completing the start of the continuation method "A::A2" of the object A, the object "mDriveMailer" returns to the object B, as indicated by the single-dot-chain arrow ST4-11, the value indicating that the processing of the method "Kick" has been correctly completed, as the return value to the method "Kick". The object "mDriveMailer" then enables the object B to restart processing. Accordingly, the object B is ready to execute processing, and if there is any remaining processing, the object B restarts the processing.

According to the aforementioned processing, the continuation method "A::A2" of the object A is started by the object B, as designated by the solid arrow ST4-12, and it is as if the object A and the object B were concurrently operating, from the point of view of the device drivers.

2-5-4 Message Passing between Different metaSpaces

A description is given below, with reference to FIG. 9, of message passing performed by using the method "Delegate" between the mCOOP metaSpace and the mDrive metaSpace.

Figure 9:
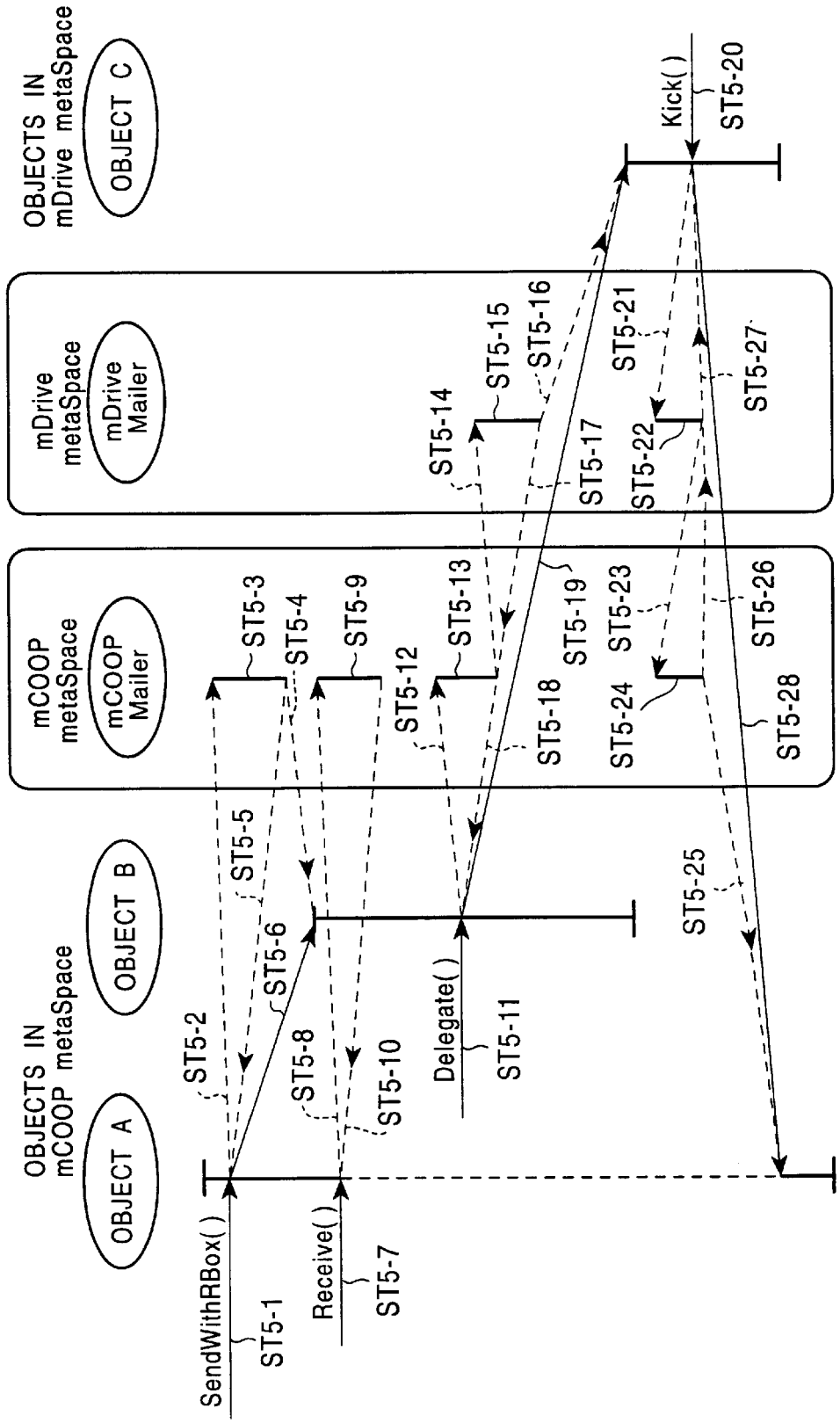
FIG. 9 illustrates an example of a scenario of message passing performed between different metaSpaces.

As a scenario of message passing performed between different metaSpaces, FIG. 9 illustrates message passing among an object A operating as an application program in the mCOOP metaSpace, an object B operating as an application program in the mCOOP metaSpace, and an object C operating as a device driver in the mDrive metaSpace. In this scenario, the object B delegates the reply authorization to the object C.

That is, in this example, the object A is a client object, while the object B and the object C are server objects. The object B delegates the object C to return the processing result to the object A. That is, the object B serves as a server object and also as an authorization-delegating object. The object C serves as a server object and also as an authorization-delegated object.

In this scenario, steps ST5-1, ST5-2, ST5-3, ST5-4, ST5-5, ST5-6, ST5-7, ST5-8, ST5-9, and ST5-10 shown in FIG. 9 are respectively similar to ST3-1, ST3-2, ST3-3, ST3-4, ST3-5, ST3-6, ST3-7, ST3-8, ST3-9, and ST3-10 shown in FIG. 3, and an explanation thereof will thus be omitted.

In this scenario, after processing proceeds to step ST5-10, when the object A is in the waiting state, and when the object B is executing processing, the object B issues the method "Delegate" for delegating the reply authorization.

When the object B issues the method "Delegate", as indicated by ST5-11, the processing is shifted to the object "mCOOPMailer", as represented by the single-dot-chain arrow ST5-12, and the processing in response to the method "Delegate" is executed by the object "mCOOPMailer", as designated by ST5-13.

In this case, the object "mCOOPMailer" determines whether the authorization-delegated object is an object operating in the mCOOP metaSpace. If it is found that the authorization-delegated object is an object operating in the mCOOP metaSpace, the processing proceeds in accordance with the scenario shown in FIG. 7. In this example, however, the authorization-delegated object is not an object operating in the mCOOP metaSpace, but is the object C operating in the mDrive metaSpace. Accordingly, the processing is shifted from the object "mCOOPMailer" to the object "mDriveMailer", as represented by the single-dot-chain arrow ST5-14.

A shift of the processing from the object "mCOOPMailer" to the object "mDriveMailer" is performed via a micro-kernel. More specifically, the object "mCOOPMailer" first determines based on the argument "destObjID" of the method "Delegate" that the metaSpace in which the authorization-delegated object is operating is an mDrive metaSpace. Subsequently, by using the function of the micro-kernel, the object "mCOOPMailer" requests the object "mDriveMailer", which is a metaObject for performing message passing between the objects operating in the mDrive metaSpace, to execute the required processing. Thus, the processing is shifted from the object "mCOOPMailer" to the object "mDriveMailer".

In this manner, after the processing is shifted from the object "mCOOPMailer" to the object "mDriveMailer", the processing in accordance with the method "Delegate" is executed by the object "mDriveMailer", as represented by ST5-15.

More specifically, the object "mDriveMailer" first reserves the data area "DeliveryBoxB". The object "mDriveMailer" then reads the identifier "rBoxID" stored in the data area "Thread" corresponding to the object B and sets the identifier "rBoxID" in the attribute "contID" of the data area "DeliveryBoxB".

Simultaneously, the identifier "rBoxID" stored in the data area "Thread" corresponding to the object B is erased, thereby depriving the object B of the reply authorization. That is, the object B loses the reply authorization by issuing the method "Delegate", and delegates the reply authorization to the object C. Since the object B has lost the reply authorization, it is unable to issue the method "Reply". In other words, the object B has issued the method "Delegate" instead of the method "Reply".

The object "mDriveMailer" also stores the message sent by the method "Delegate" in the data area "DeliveryBoxB". More specifically, the value of the argument "msg" of the method "Delegate" is set in the attribute "msg" of the data area "DeliveryBoxB", and also, the value of the argument "sizeOfMsg" of the method "Delegate" is set in the attribute "sizeOfMsg" of the data area "DeliveryBoxB".

The object "mDriveMailer" then delivers to the object C, as indicated by the single-dot-chain arrow ST5-16, the data stored in the data area "DeliveryBoxB", i.e., the message sent by the method "Delegate", and the identifier "rBoxID" for specifying the data area "RBox", thereby starting the method of the object C.

In this case, only the message has been sent to the method of the object C, and the identifier "rBoxID" is stored in the data area "Thread" corresponding to the object C. In other words, the identifier "rBoxID" to be delivered to the object C is under the management of the operating system, and it is only the message that has been sent to the object C, from the point of view of the application program.

In starting the method of the object C by delivering the data stored in the data area "DeliveryBoxB" from the object "mDriveMailer" to the object C, the object C is specified by the argument "destObjID" of the method "Delegate", and the method of the object C is designated by the argument "meth" of the method "Delegate".

Upon completing the aforementioned processing, the object "mDriveMailer" returns to the object B via the object "mCOOPMailer", as indicated by the single-dot-chain arrows ST5-17 and ST5-18, the value indicating that the processing has been correctly completed, as the return value to the method "Delegate", and then enables the object B to restart processing. The object B is now ready to execute processing, and if there is any remaining processing, the object B restarts the processing.

According to the aforementioned processing, the reply authorization has been delegated from the object B to the object C, as indicated by the solid arrow ST5-19, and it is as if the object B and the object C were concurrently operating, from the point of view of the application programs.

Thereafter, upon completing the processing requested by the object A, the object C issues the method "Kick", as designated by ST5-20. Upon issuing the method "Kick", the processing is shifted to the object "mDriveMailer", as represented by the single-dot-chain arrow ST5-21, and the processing in response to the method "Kick" is executed by the object "mDriveMailer", as indicated by ST5-22.

Simultaneously, the object "mDriveMailer" reads the information stored in the data area "Thread" corresponding to the object C. If the identifier "contID" specifying the data area "Continuation" is stored in the data area "Thread", the processing for starting the continuation method proceeds in accordance with the scenario shown in FIG. 8. In this example, however, not the identifier "contID" designating the data area "Continuation", but the identifier "rBoxID" specifying the data area "RBox" is stored in the data area "Thread".

Since the identifier "rBoxID" specifying the data area "RBox" is stored in the data area "Thread", as noted above, the processing is shifted from the object "mDriveMailer" to the object "mCOOPMailer", as indicated by the single-dot-chain arrow ST5-23, rather than starting the continuation method by the object "mDriveMailer".

A shift of the processing from the object "mDriveMailer" to the object "mCOOPMailer" is performed via the micro-kernel. More specifically, the object "mDriveMailer" first checks whether the identifier stored in the data area "Thread" corresponding to the object C is the identifier "contID" for specifying the data area "Continuation" used in the mDrive metaSpace. In this example, it is determined that the identifier stored in the data area "Thread" corresponding to the object C is not the identifier "contID" designating the data area "Continuation".

The information for determining the metaSpace in which the object to be communicated by message passing is operating is also stored in the data area "Thread" corresponding to each object. The identifier stored in the data area "Thread" corresponding to the object C is not the identifier "contID" for specifying the data area "Continuation". Thus, the data area "Thread" corresponding to the object C is further examined to determine the metaSpace in which the object to be communicated by message passing is operating. As a result, it is determined in this example that the metaSpace in which the object to be communicated by message passing is operating is a mCOOP metaSpace.

Then, by using the function of the micro-kernel, the object "mDriveMailer" requests the object "mCOOPMailer", which is a metaObject for performing message passing between the objects operating in the mCOOP metaSpace, to execute the required processing. Thus, the processing is shifted from the object "mDriveMailer" to the object "mCOOPMailer".

In this manner, after the processing has been shifted from the object "mDriveMailer" to the object "mCOOPMailer", the processing in accordance with the method "Kick" is executed by the object "mCOOPMailer", as indicated by ST5-24.

More specifically, if the object A has already issued the method "Receive", the object "mCOOPMailer" delivers the result of the processing executed by the object C to the object A. If the object A has not yet issued the method "Receive", the object "mCOOPMailer" stores the processing result of the object C in the data area "RBox".

In this example, when the object C issues the method "Kick", the object A has already issued the method "Receive". Accordingly, the object "mCOOPMailer" immediately delivers to the object A, as designated by the single-dot-chain arrow ST5-25, the processing result of the object C without storing it in the data area "RBox". Upon correctly completing the processing for the delivery of the processing result of the object C to the object A, the object "mCOOPMailer" returns to the object C via the object "mDriveMailer", as represented by the single-dot-chain arrows ST5-26 and ST5-27, the value indicating that the processing has been correctly completed, as the return value to the method "Kick". The "mCOOPMailer" then enables the object C to restart processing. The object C is now ready to execute processing, and if there is any remaining processing, the object C restarts the processing.

According to the above-described processing, the result of the processing executed by the object C has been sent to the object A, as indicated by the solid arrow ST5-28, and it is as if the object A and the object C were concurrently operating, from the point of view of the application programs.

In the example shown in FIG. 9, the method "Receive" has been issued before the method "Kick" is issued. Alternatively, the method "Receive" may be issued after the method "Kick" has been issued. In this case, the object A is able to immediately receive the result of the processing executed by the object C without entering the waiting state.

If the object A issues the method "Receive" after the object C has issued the method "Kick", the object "mCOOPMailer" executes the following processing. The object "mCOOPMailer" stores the processing result of the object C in the data area "RBox" when the method "Kick" is issued by the object C. Then, when the object A issues the method "Receive", the "mCOOPMailer" immediately reads the processing result of the object C from the data area "RBox" and delivers it to the object A.

The result of the processing executed by the object C is stored in the data area "RBox". More specifically, the value indicating that the processing result of the object C has been returned is set in the attribute "ready " of the data area "RBox", and the pointer to the area for storing the message to be delivered to the object A as the processing result of the object C, i.e., the pointer represented by the argument "msg" of the method "Kick", is set in the attribute "resultMsg" of the data area "RBox". Moreover, the value indicating the size of the message to be delivered to the object A as the processing result of the object C, i.e., the value represented by the argument "sizeOfMsg" of the method "Kick", is set in the attribute "sizeOfResultMsg" of the data area "RBox".

In reading the processing result of the object C from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object C to the object A. The object "mCOOPMailer" then stores the read data In the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Kick" has been issued, as well as when the method "Receive" has been issued before the method "Kick" is issued, the result of the processing executed by the object C is delivered to the object A, and it is as if the object A and the object C were concurrently operating.

If the object delegated to possess the reply authorization by the method "Delegate" (in this example, the object C) becomes inoperable due to, for example, the occurrence of an error, and is unable to acquire a result, exception handling is performed in a manner substantially similar to the scenario shown in FIG. 6.

More specifically, in the example shown in FIG. 9, if the object C delegated to possess the reply authorization by the method "Delegate" becomes inoperable during execution due to, for example, the occurrence of an error and is unable to obtain a result, the processing is shifted to the object "mDriveFaultHandler", and predetermined exception handling is performed by the object "mDriveFaultHandler". The object "mDriveFaultHandler" then reports to the object "mCOOPMailer" via the object "mDriveMailer" that the object C has become inoperable due to the occurrence of an error.

In this case, if the object A has already issued the method "Receive" and is in the waiting state, the object "mCOOPMailer" returns to the object A the error code indicating that the object C has become inoperable due to the occurrence of an error, as the return value to the method "Receive", and then enables the object A to restart processing. Thus, the object A is ready to execute processing, and if there is any remaining processing, the object A restarts the processing.

On the other hand, if an exception has occurred to the object C before the object A issues the method "Receive", the object "mCOOPMailer" sets in the attribute "status" of the data area "RBox" the error code indicating that the object C has become inoperable due to the occurrence of an error. Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to restart processing. Accordingly, the object A is ready to execute processing, and if there is any remaining processing, the object A restarts the processing.

According to the aforementioned processing, even if the object C delegated to possess the reply authorization is unable to return a result message to the object A for some reason, the object A can be resumed to the execution state from the waiting state, which would otherwise cause the object A to enter the waiting state and would stop the system.

2-6 Another Example

In the foregoing embodiment, in order to implement message passing in the server objects in which a processing request is received and a processing result is returned by different server objects, the method "Delegate" for delegating the reply authorization is used within the server objects. It is, however, possible to implement message passing without needing to employ a method for delegating the reply authorization, such as the method "Delegate", in the server objects in which a server object that receives a processing request is different from a server object that returns a processing result.

A description is given below of a method for performing message passing by providing an identifier for identifying which future is to be used for delivering a result to the client object, as an example of a method for implementing the message passing without the need for employing the method "Delegate" in the server objects constructed as described above.

2-6-1 mCOOP metaSpace API

In this example, the following method "Send" and the method "GetReplyID" are introduced as APIs used for describing the objects operating in the mCOOP metaSpace. Also, the following method "ReplyWithReplyID" is used instead of the above-described method "Reply". In this example, the APIs are indicated in compliance with the OMG IDL.

sError Send(in OID destObjID, in Selector meth, in any msg, in size_t sizeOfMsg)

sError GetReplyID(out ReplyID replyID)

sError ReplyWithReplyID(in ReplyID replyID, in any resultMsg, in size_t sizeOfResultMsg)

By introducing the above-described methods "Send", "GetReplyID", and "ReplyWithReplyID", message passing can be performed without the need for the use of the method "Delegate" in the server objects in which a processing request is received and a processing result is returned by different server objects. The above methods are discussed in detail below.

2-6-1-1 Send( )

sError Send(in OID destObjID, in Selector meth, in any msg, in size_t sizeOfMsg)

The method "Send" is a message-sending method for executing processing for sending a message from a client object to a server object. The method "Send" is employed when the client object does not need the result of the processing executed by the server object after it has sent the message to the server object.

The argument "destObjID" is an argument of the "OID" type, which is a data type for specifying the object. The value for specifying the server object is set in the argument "destObjID".

The argument "meth" is an argument of the "Selector" type, which is a data type for designating the method. The value for designating the method of the server object in which the required processing is described is set in the argument "meth".

The argument "msg" is an argument of the "any" type, which is an arbitrary data type. The pointer to the area for storing the message to be delivered to the server object is set in the argument "msg".

The argument "sizeOfMsg" is an argument of the "size_t" type, which is a data type for specifying the size of the data. The value indicating the size of the message to be delivered to the server object is set in the argument "sizeOfMsg".

The method "Send" obtains the value of the "sError" type, which is a data type representing the error code, as the return value. That is, if the processing of the method "Send" is not correctly completed upon issuing this method, the error code representing the reason for failure to complete the processing is returned as the return value. If the processing is correctly completed, the value indicating that the processing has been correctly completed is returned as the return value.

2-6-1-2 GetReplyID( )

sError GetReplyID(out ReplyID replyID)

As discussed above, when the method "Reply" is issued, the result is delivered to the client object via a future (i.e., the data area "RBox"). The method "GetReplyID" is used instead of the method "Reply", and is employed for enabling a server object to obtain the identifier "replyID". The identifier "replyID" is an identifier for identifying which future is to be used in subsequently delivering the result from another server object to the client object.

More specifically, the method "GetReplyID" acquires, as the return value, the identifier "replyID" of the "ReplyID" type, which is a data type for specifying the future used for the delivery of the result. The identifier "replyID" is an identifier for identifying which future is to be used in delivering the result to the client object. In other words, the identifier "replyID" is an identifier for specifying the future reserved by the object "mCOOPMailer" when the method "SendWithRBox" is issued.

The identifier "replyID" is substantially the same as the above-described identifier "rBoxID", and the two identifiers may be regarded as the same. However, the purpose of the use for the identifier "replyID" is different from that for the identifier "rBoxID". Accordingly, in this example, a difference in the purpose of use between the two identifiers is clarified by using a data type for the identifier "replyID" which is different from that for the identifier "rBoxID".

The method "GetReplyID" obtains the value of the "sError" type, which is a data type representing the error code, as the return value. That is, if the processing for the method "GetReplyID" is not completed in a normal condition upon issuing this method, the error code representing the reason for failure to complete the processing is returned as the return value. If the processing is completed in a normal condition, the value is returned indicating that the processing has been correctly completed.

2-6-1-3 ReplyWithReplyID( )

sError ReplyWithReplyID(in ReplyID replyID, in any resultMsg, in size_t sizeOfResultMsg)

The method "ReplyWithReplyID" is employed when the server object returns the processing result to the client object after the client object has issued the method "SendWithRBox". The method "ReplyWithReplyID" is used in place of the method "Reply" by a server object.

As noted above, when the method "Reply" is issued, the result is delivered to the client object via a future (i.e., the data area "RBox"). The method "ReplyWithReplyID" is employed instead of the method "Reply", and is used for delivering the result from a server object to the client object via the future specified by the identifier "replyID".

The argument "replyID" is an argument of the "ReplyID" type, which is a data type for specifying the future to be used in delivering the result. The identifier designating the future reserved by the object "mCOOPMailer" when the method "SendWithRBox" has been issued is set in the argument "replyID". In other words, the value of the identifier "replyID" obtained by issuing the method "GetReplyID" is set in the argument "replyID".

The argument "resultMsg" is an argument of the "any" type, which is an arbitrary data type. The pointer to the area for storing the message to be delivered to the client object is set in the argument "resultMsg".

The argument "sizeOfResultMsg" is an argument of the "size_t" type, which is a data type for specifying the size of the data. The value indicating the size of the message to be delivered to the client object is set in the argument "sizeOfResultMsg".

The method "ReplyWithReplyID" acquires the value of the "sError" type, which is a data type representing the error code, as the return value. More specifically, if the processing for the method "ReplyWithReplyID" upon issuing this method is not correctly completed, the error code representing the reason is returned as the return value. If the processing is correctly completed, the value is returned indicating that the processing has been correctly completed.

In the method "ReplyWithReplyID", there are a larger number of the arguments "replyID" of the "ReplyID" types than those of the aforementioned method "Reply". By using the argument "replyID", the object "mCOOPMailer" is able to specify the future to be used in returning the result to the client object, as will be discussed later. This enables the server object to return the result to the client object by using an object different from the object that has received the message from the client object.

2-6-2 Message Passing

A detailed description is given below, with reference to FIG. 10, of an example of a specific scenario of message passing performed by employing the above-described methods "Send", "GetReplyID", and "ReplyWithReplyID" in the server objects in which a processing request is received and a processing result is returned by different server objects.

Figure 10:
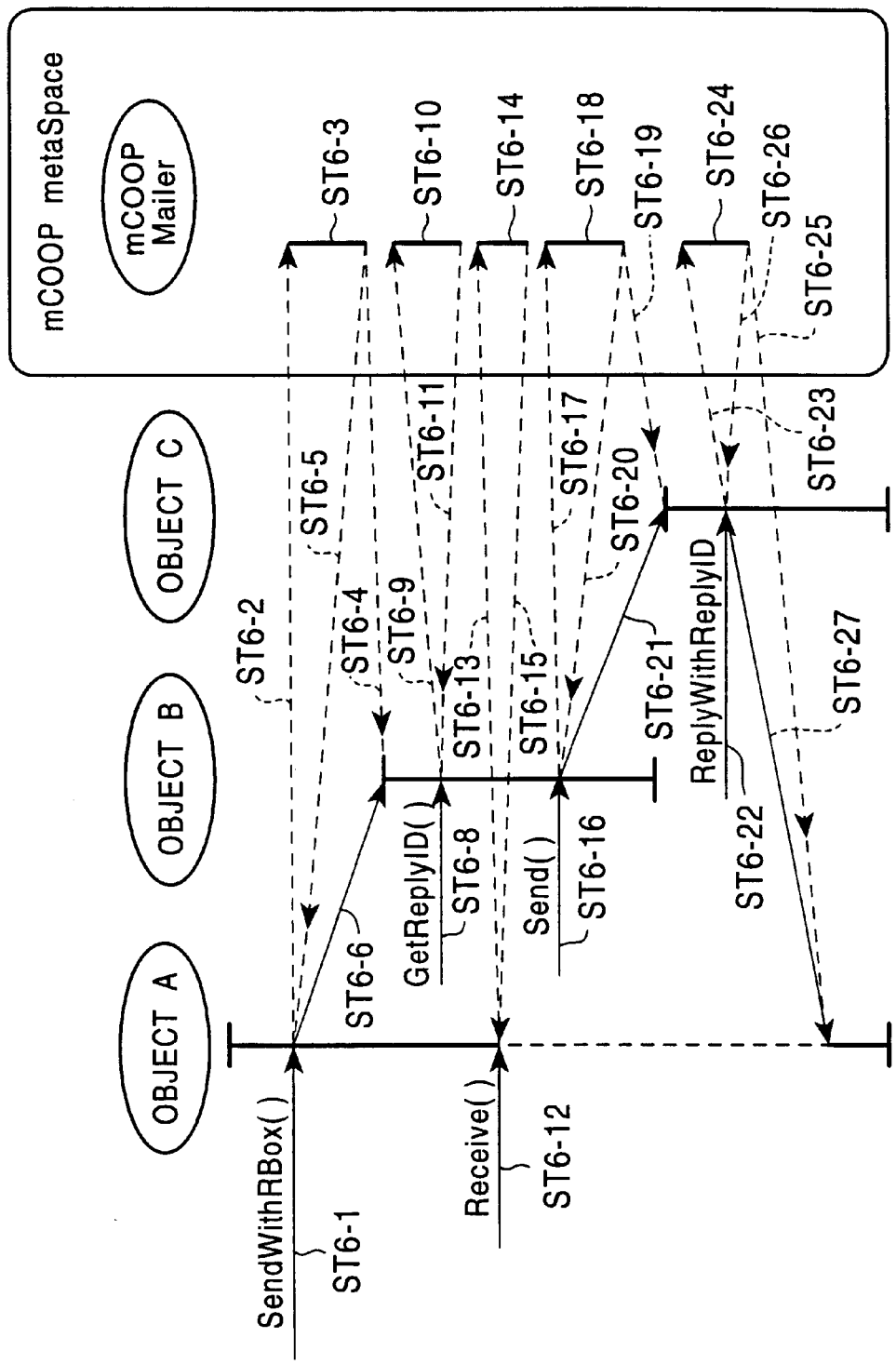
FIG. 10 illustrates another example of a scenario of message passing performed in the server objects in which a processing request is received and a processing result is returned by different server objects.

FIG. 10, which will be referred to in the following description, illustrates a shift of processing and message exchange in message passing, as well as FIGS. 5 through 9. The single-dot-chain arrows in FIG. 10 indicate a shift of processing and message exchange within the operating system, while the solid arrows in FIG. 10 designate a shift of processing and message exchange from the point of view of the application programs.

FIG. 10 illustrates a scenario of message passing in the mCOOP metaSpace performed among an object A, an object B, and an object C, all of which are operating as application programs in the mCOOP metaSpace. In this scenario, the object B receives a message from the object A, and the object C returns the processing result to the object A. That is, in this example, the object A is a client object, while the object B and the object C are server objects.

When the object A issues the method "SendWithRBox", as indicated by ST6-1, the processing is shifted to the object "mCOOPMailer", as designated by the single-dot-chain arrow ST6-2, and the processing in accordance with the method "SendWithRBox" is executed by the object "mCOOPMailer", as represented by ST6-3.

The object "mCOOPMailer" first reserves the data area "RBox" for storing the processing result of the server object, and then sets the data area "Thread" corresponding to the object A in the attribute "creator" of the data area "RBox".

The object "mCOOPMailer" then reserves the data area "DeliveryBoxA", and stores the identifier "rBoxID" for specifying the data area "RBox" and the message sent by the method "SendWithRBox" therein.

The identifier "rBoxID" for designating the data area "RBox" is stored in the data area "DeliveryBoxA", and more specifically, the value of the identifier "rBoxID" for specifying the data area "RBox" is set in the attribute "rBoxID" of the data area "DeliveryBoxA".

The message sent by the method "SendWithRBox" is stored in the data area "DeliveryBoxA". More specifically, the value of the argument "msg" of the method "SendWithRBox" is set in the attribute "msg" of the data area "DeliveryBoxA", and the value of the argument "sizeOfMsg" of the method "SendWithRBox" is set in the attribute "sizeOfMsg" of the data area "DeliveryBoxA".

Thereafter, the object "mCOOPMailer" delivers to the object B, as represented by the single-dot-chain arrow ST6-4, the data stored in the data area "DeliveryBoxA", i.e., the message sent by the method "SendWithRBox", and the identifier "rBoxID" for designating the reserved data area "RBox", thereby starting the method of the object B.

In this case, only the message is delivered to the method of the object B, and the identifier "rBoxID" is stored in the data area "Thread" corresponding to the object B. In other words, the identifier "rBoxID" to be delivered to the object B is under the management of the operating system, and it is only the message that has sent to the object B, from the point of view of the application program.

In starting the method of the object B by delivering the data stored in the data area "DeliveryBoxA" from the object "mCOOPMailer" to the object B, the object B is designated by the argument "destObjID" of the method "SendWithRBox", and the method of the object B is specified by the argument "meth" of the method "SendWithRBox".

Upon completing the above-described processing, the object "mCOOPMailer" returns to the object A, as indicated by the single-dot-chain arrow ST6-5, the identifier "rBoxID" for specifying the reserved data area "RBox", and also returns to the object A the value indicating that the processing has been correctly completed, as the return value to the method "SendWithRBox". The object "mCOOPMailer" then enables the object A to restart processing. The object A is now ready to execute processing, and if there is any remaining processing, the object A restarts processing.

According to the aforementioned processing, the message has been delivered from the object A to the object B, as represented by the solid arrow ST6-6, and it is as if the object A and the object B were concurrently operating, from the point of view of the application programs.

Thereafter, when the object B issues the method "GetReplyID", as designated by ST6-8, the processing is shifted to the object "mCOOPMailer", as indicated by the single-dot-chain arrow ST6-9, and the processing in response to the method "GetReplyID" is executed by the object "mCOOPMailer", as represented by ST6-10.

More specifically, the object "mCOOPMailer" reads the identifier "rBoxID" stored in the data area "Thread" corresponding to the object B, and then returns the value of the identifier "rBoxID" as the return value to the method "GetReplyID".

Upon completing the above-described processing, the object "mCOOPMailer" returns to the object B, as designated by the single-dot-chain arrow ST6-11, the value indicating that the processing has been correctly completed, as the return value to the method "GetReplyID". The object "mCOOPMailer" then enables the object B to restart processing. Thus, the object B is able to execute processing, and if there is any remaining processing, the object B executes the processing.

Subsequently, upon issuing the method "Receive" by the object A, as indicated by ST6-12, the processing is shifted to the object "mCOOPMailer", as designated by the single-dot-chain arrow ST6-13, and the processing in accordance with the method "Receive" is executed by the object "mCOOPMailer", as represented by ST6-14.

More specifically, the object "mCOOPMailer" refers to the data area "RBox" specified by the argument "rBoxID" of the method "Receive". If the result of the processing executed by the server object is stored in the data area "RBox", the object "mCOOPMailer" delivers the result to the object A. If the processing result of the server object is not stored in the data area "RBox", the object "mCOOPMailer" changes the state of the object A from the execution state to the waiting state.

In this example, when the object A issues the method "Receive", the result of the processing executed by the server object is not yet stored in the data area "RBox". Accordingly, the object "mCOOPMailer" reports to the object A, as represented by the single-dot-chain arrow ST6-15, that the processing result of the server object is not yet stored in the data area "RBox", and changes the state of the object A from the execution state to the waiting state.

Thereafter, when the object B issues the method "Send", as indicated by ST6-16, the processing is shifted to the object "mCOOPMailer", as designated by the single-dot-chain arrow ST6-17, and the processing in response to the method "Send" is executed by the object "mCOOPMailer", as represented by ST6-18.

More specifically, the object "mCOOPMailer" first reads the data having the size indicated by the argument "sizeOfMsg" from the area designated by the argument "msg" of the method "Send". The read data serves as a message to be delivered from the object B to the object C. The object "mCOOPMailer" then delivers the message to the object C, as indicated by ST6-19, thereby starting the method of the object C.

The object C is specified by the argument "destObjID" of the method "Send", and the method of the object C is designated by the argument "meth" of the method "Send". In issuing the method "Send", the information concerning the identifier "replyID" obtained by issuing the method "GetReplyID" is included in the message to be delivered to the object C by the method "Send". This makes it possible to deliver from the object B to the object C the information required for specifying the future to be used in delivering the result to the client object.

Upon completing the aforementioned processing, the object "mCOOPMailer" returns to the object B, as represented by the single-dot-chain arrow ST6-20, the value indicating that the processing has been correctly completed, as the return value to the method "Send", and then enables the object B to restart processing. Consequently, the object B is ready to execute processing, and if there is any remaining processing, the object B restarts the processing.

According to the aforementioned processing, the message has been delivered from the object B to the object C, as indicated by the solid arrow ST6-21, and it is as if the object B and the object C were concurrently operating, from the point of view of the application programs.

Subsequently, when the object C issues the method "ReplyWithReplyID", as indicated by ST6-22, the processing is shifted to the object "mCOOPMailer", as designated by the single-dot-chain arrow ST6-23. The value of the identifier "replyID" for specifying the future used in delivering the result to the client object is set in the argument "replyID" of the method "ReplyWithReplyID". According to the identifier "replyID", the data area "RBox" used in delivering the result to the client object is specified.

The object "mCOOPMailer" then executes the processing in response to the method "ReplyWithReplyID", as represented by ST6-24. More specifically, if the object A has already issued the method "Receive", the object "mCOOPMailer" delivers the processing result of the object C to the object A. If the object A has not yet issued the method "Receive", the object "mCOOPMailer" stores the processing result of the object C in the data area "RBox".

In this example, when the object C issues the method "ReplyWithReplyID", the object A has already issued the method "Receive". Accordingly, the object "mCOOPMailer" immediately delivers to the object A, as indicated by the single-dot-chain arrow ST6-25, the processing result of the object C without storing it in the data area "RBox". Upon correctly completing the processing for the delivery of the processing result of the object C to the object A, the object "mCOOPMailer" returns to the object C, as represented by the single-dot-chain arrow ST6-26, the value indicating that the processing has been correctly completed, as the return value to the method "ReplyWithReplyID". The object "mCOOPMailer" then enables the object C to restart processing. The object C is now ready to execute processing, and if there is any remaining processing, the object C restarts the processing.

According to the above-described processing, the result of the processing executed by the object C has been delivered to the object A, as designated by the solid arrow ST6-27, and it is as if the object A and the object C were concurrently operating, from the point of view of the application programs.

In the example shown in FIG. 10, the method "Receive" issued before the method "ReplyWithReplyID" is issued. Alternatively, the method "Receive" may be issued after the method "ReplyWithReplyID" has been issued. In this case, the object A is able to immediately receive the result of the processing executed by the object C without entering the waiting state.

If the object A issues the method "Receive" after the object C has issued the method "ReplyWithReplyID", the object "mCOOPMailer" executes the following processing. The object "mCOOPMailer" stores the processing result of the object C in the data area "RBox" when the method "ReplyWithReplyID" is issued by the object C. Then, when the object A issues the method "Receive", the "mCOOPMailer" immediately reads the processing result of the object C from the data area "RBox" and delivers it to the object A.

The data area "RBox" for storing the processing result of the object C is designated by the argument "replyID" of the method "ReplyWithReplyID". More specifically, as discussed above, the value of the identifier "replyID" for specifying the future to be used in delivering the result to the client object is set in the argument "replyID" of the "ReplyWithReplyID", thereby specifying the data area "RBox" used in delivering the result to the client object.

The result of the processing executed by the object C is stored in the data area "RBox". More specifically, the value indicating that the processing result of the object C has been returned is set in the attribute "ready" of the data area "RBox", and the pointer to the area for storing the message to be delivered to the object A as the processing result of the object C, i.e., the pointer represented by the argument "resultMsg" of the method "ReplyWithReplyID", is set in the attribute "resultMsg" of the data area "RBox". Moreover, the value indicating the size of the message to be delivered to the object A as the processing result of the object C, i.e., the value represented by the argument "sizeOfResultMsg" of the method "ReplyWithReplyID", is set in the attribute "sizeOfResultMsg" of the data area "RBox".

In reading the processing result of the object C from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object C to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "ReplyWithReplyID" has been issued, as well as when the method "Receive" has been issued before the method "ReplyWithReplyID" is issued, the result of the processing executed by the object C is delivered to the object A, and it is as if the object A and the object C were concurrently operating.

According to the above description, by introducing the methods "Send", "GetReplyID", and "ReplyWithReplyID" as the APIs used for describing the objects, message passing can be implemented even if there are a plurality of server objects, and even if a processing request is received and a processing result is returned by different server objects.

2-6-3 Comparison with Message Passing Using Delegate( )

As discussed above, by introducing the methods "Send", "GetReplyID", and "ReplyWithReplyID", message passing can be implemented even if there are a plurality of server objects, and even if a processing request is received and a processing result is returned by different server objects. However, this method presents a problem when it is used for running an application program on an operating system.

Before introducing the method "GetReplyID" and the method "ReplyWithReplyID", the relationship between the client object that has sent the message and the future, or the relationship between the future and the server object that has received the message is constantly managed by the operating system.

However, by introducing the method "GetReplyID" and the method "ReplyWithReplyID", the information concerning the future can be sent and received between the objects forming the application program by delivering the message therebetween without the interference of the operating system. That is, after obtaining the identifier "replyID" by issuing the method "GetReplyID", the information concerning the future (i.e., the identifier "replyID") can be received and sent as a message. It is thus possible to send and receive the information concerning the future between the objects of the application program without the interference of the operating system.

In this manner, if the information concerning the future is sent and received between the objects of the application program without interference by the operating system, it becomes impossible for the operating system to manage the relationship between the client object and the future or the relationship between the future and the server object.

If message passing is performed in the above state, the system may not be restarted when, for example, an exception occurs.

For example, it is now assumed that an exception occurs with respect to the object "mCOOPMailer", and the processing result of the server object is unable to be returned to the client object when the client object is waiting for the processing result of the server object via a future.

In this state, if the relationships between the objects are not under the management of the operating system, the information indicating that an exception has occurred to the object "mCOOPMailer" cannot be reported to the client object which is in the waiting state. This causes the client object to remain in the waiting state.

If the object remaining in the waiting state cannot be resumed to the normal condition, as discussed above, it appears to the user that the system has stopped for an unknown reason. It is desired that the operating system provide a function for stably operating software running on the operating system. Accordingly, it is a serious problem for the user that the system has stopped for an unknown reason.

The above-described problem originates from the fact that it has become impossible for the operating system to manage the relationship between the client object and the future or the relationship between the future and the server object when a processing request is received and a processing result is returned by different server objects. Accordingly, the above-described problem can be solved if the relationship between the client object and the future or the relationship between the future and the server object is constantly under the management of the operating system.

More specifically, instead of providing the APIs that directly handle the information of the future, such as the method "GetReplyID" and the method "ReplyWithReplyID", the method "Delegate" for delegating the authorization for the delivery of the result to another object is provided.

By using the method "Delegate" rather than the method "GetReplyID" and the method "ReplyWithReplyID", it becomes possible for the operating system to constantly manage the relationship between the client object and the future or the relationship between the future and the server object even if there are a plurality of server objects and even if a processing request is received and a processing result is returned by different server objects. The aforementioned problem can thus be solved.

By introducing the method "Delegate", the information concerning the future is not sent and received by delivering a message between the objects of the application program, but is sent and received under the management of the operating system by using the data area "DeliveryBoxA". Accordingly, the information of the future is always delivered under the management of the operating system, which would otherwise impede the operating system from managing the relationship between the client object and the future or the relationship between the future and the server object. As a result, the client object can be prevented from remaining in the waiting state due to, for example, the occurrence of an error, thereby further consolidating the system.

By introducing the method "Delegate", in delegating the reply authorization among the server objects, the data area "RBox" and the identifier "rBoxID" for specifying the data area "RBox" are transparent to the application program. This enhances the simplicity of the development of application programs.

As is seen from the foregoing detailed description, the present invention offers the following advantages. In performing future-based message passing, the authorization for the delivery of the result can be delegated to another object. Thus, even if there are a plurality of server objects and even if a processing request is received and a processing result is returned by different server objects, message passing can be suitably performed.

What is claimed is:

1. A data processing method wherein a message is sent from a client object to a server object that includes two or more objects and said server object executes a processing in response to a request by said message and returns a result of said processing to said client object, said data processing method comprising the steps of:

reserving a data area for storing said result of said processing executed by said server object upon sending said message from said client object to said server object;

delegating an authorization for returning said result of said processing executed by said server object to said client object between said two or more objects of said server object upon an execution of said processing by said server object in response to said request by said message;

storing in said data area said result of said processing executed by one of said two or more objects of said server object delegated with said authorization for returning said result of said processing; and receiving by said client object said result of said processing executed by said server object by reading the data stored in said data area.

2. The data processing method according to claim 1, further comprising the steps of:

controlling said client object for continuing processing after said client object has sent said message to said server object, and for reading said data stored in said data area when said client object requires said result of said processing executed by said server object;

controlling said client object for entering a waiting state when said result of said processing executed by said server object is not stored in said data area upon reading by said client object of said data stored in said data area; and causing said client object to remain in said waiting state before said result of said processing executed by said server object is stored in said data area.

3. A recording medium whereon an operating system is recorded, wherein said operating system includes:

message-sending means for sending a message from a client object to a server object having a plurality of objects; and authorization-delegating means for delegating an authorization between said plurality of objects, said message-sending means and said authorization-delegating means being used as application program interfaces for describing said pluarity of objects; and wherein said operating system sends a message from said client object to said server object upon a request to execute said message-sending means, and reserves a data area for storing a result of a processing executed by said server object;

said operating system delegates an authorization for returning said result of said processing executed by said server object to said client object from a first object of said pluraity of objects of said server object to a second object of said plurality of objects of said server object upon a request to execute said authorization-delegating means; and said operating system stores in said data area said result of said processing executed by one of said plurality of objects of said server object delegated with said authorization by said authorization-delegating means, upon completing said processing by said server object in response to said message sent to said server object by said message-sending means.

4. The recording medium according to claim 3, wherein said operating system further includes data reading means for reading said data stored in said data area, as an application program interface used for describing one of said plurality of objects.

5. The recording medium according to claim 4, wherein:

said operating system causes said client object to enter a waiting state when said result of said processing executed by said server object is not stored in said data area upon reading by said client object according to said data reading means said data stored in said data area; and said operating system causes said client object to remain in said waiting state before said result of said processing executed by said server object is stored in said data area.

6. A data processing apparatus comprising :

an operating system;

a recording medium whereon said operating system is recorded, said operating system including:

message-sending means for sending a message from a client object to a server object having a plurality of objects; and authorization-delegating means for delegating an authorization between said plurality of objects, said message-sending means and said authorization-delegating means being used as application program interfaces for describing said plurality of objects; and wherein said operating system sends a message from said client object to said server object upon a request to execute said message-sending means, and reserves a data area for storing a result of a processing executed by said server object;

said operating system delegates an authorization for returning said result of said processing executed by said server object to said client object from a first object of said plurality of objects of said server object to a second object of said plurality of objects of said server object upon request to execute said authorization-delegating means; and said operating system stores in said data area said result of said processing executed by one of said plurality of objects of said server object delegated with said authorization by said authorization-delegating means, upon completing said processing by said server object in response to said message sent to said server object by said message-sending means.

7. The data processing apparatus according to claim 6, wherein said operating system further includes data reading means for reading said data stored in said data area, as an application program interface used for describing one of said plurality of objects.

8. The data processing apparatus according to claim 7, wherein:

said operating system controls said client object for entering a waiting state when said result of said processing executed by said server object is not stored in said data area upon reading by said client object according to said data reading means said data stored in said data area; and said operating system controls said client object for remaining in said waiting state before said result of said processing executed by said server object is stored in said data area.

* * * * *